(12) United States Patent
Heber et al.

(10) Patent No.: US 11,906,828 B2
(45) Date of Patent: Feb. 20, 2024

(54) SWITCHABLE LIGHT FILTER AND USE THEREOF

(71) Applicant: SiOPTICA GmbH, Jena (DE)

(72) Inventors: André Heber, Weimar (DE); Andreas Bregulla, Duderstadt (DE); Yannick Bourgin, Ilmtal-Weinstrasse/OT Ossmannstedt (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 17/758,617

(22) PCT Filed: Sep. 27, 2021

(86) PCT No.: PCT/EP2021/076471
§ 371 (c)(1),
(2) Date: Jul. 11, 2022

(87) PCT Pub. No.: WO2022/069397
PCT Pub. Date: Apr. 7, 2022

(65) Prior Publication Data
US 2023/0053738 A1 Feb. 23, 2023

(30) Foreign Application Priority Data

Sep. 30, 2020 (DE) .................... 10 2020 006 110.9
May 19, 2021 (DE) .................... 10 2021 112 947.8

(51) Int. Cl.
*G02F 1/13* (2006.01)
*G02F 1/1335* (2006.01)
(Continued)

(52) U.S. Cl.
CPC ......... *G02F 1/1323* (2013.01); *G02B 6/0056* (2013.01); *G02F 1/0136* (2013.01);
(Continued)

(58) Field of Classification Search
CPC ................ G02F 1/1323; G02F 1/0136; G02F 1/133509; G02F 1/133528;
(Continued)

(56) References Cited

U.S. PATENT DOCUMENTS 5,993,940 A 11/1999 Ouderkirk et al.
6,765,550 B2 7/2004 Janick et al.
(Continued)

FOREIGN PATENT DOCUMENTS

CN 103091883 B 11/2015
CN 111448486 A 7/2020
(Continued)

*Primary Examiner* — Donald L Raleigh
(74) *Attorney, Agent, or Firm* — Christensen, Fonder, Dardi & Herbert PLLC

(57) ABSTRACT

An optical element which can be utilized in various versions and implementations of switchable light filters having, in addition, polarization filters and/or other means for varying the polarization characteristics of light, for example, liquid crystal layers. A combination of switchable light filter and imaging display device makes possible a private viewing effect that can be switched on and off. The optical element comprises a first layer or a first layer and a plurality of further layers, each layer including a material with a plurality of light-absorbing transition dipole moments. At least in a first state, each transition dipole moment is oriented, with a tolerance of 10° at the maximum, parallel to a selectable preferential direction or fluctuates around it so that light which is incident in the optical element is transmitted or at least partially absorbed depending on its incident direction.

23 Claims, 7 Drawing Sheets

(51) Int. Cl.
  *F21V 8/00* (2006.01)
  *G02F 1/01* (2006.01)
  *G02F 1/1347* (2006.01)
  *G02F 1/137* (2006.01)
(52) U.S. Cl.
  CPC .......... *G02F 1/137* (2013.01); *G02F 1/13475* (2013.01); *G02F 1/133509* (2013.01); *G02F 1/133528* (2013.01); *G02F 1/133626* (2021.01); *G02F 2202/04* (2013.01); *G02F 2203/01* (2013.01); *G02F 2203/48* (2013.01)
(58) Field of Classification Search
  CPC .......... G02F 1/133626; G02F 1/13475; G02F 1/137; G02F 2202/04; G02F 2203/01; G02F 2203/48; G02B 6/0056
  See application file for complete search history.

(56) References Cited

U.S. PATENT DOCUMENTS

| | | | |
|---|---|---|---|
| 8,988,643 | B2 | 3/2015 | Yang et al. |
| 9,229,253 | B2 | 1/2016 | Schwartz et al. |
| 9,229,261 | B2 | 1/2016 | Schwartz et al. |
| 9,459,472 | B2 | 10/2016 | Kim et al. |
| 10,126,575 | B1 | 11/2018 | Robinson et al. |
| 10,303,030 | B2 | 5/2019 | Robinson et al. |
| 10,551,648 | B2 | 2/2020 | Jeon et al. |
| 10,627,670 | B2 | 4/2020 | Robinson et al. |
| 10,649,248 | B1 | 5/2020 | Fan Jiang et al. |
| 10,670,921 | B2 | 6/2020 | Yanai |
| 10,712,608 | B2 | 7/2020 | Robinson et al. |
| 10,782,545 | B2 | 9/2020 | Smith et al. |
| 10,788,710 | B2 | 9/2020 | Robinson et al. |
| 10,802,356 | B2 | 10/2020 | Harrold et al. |
| 10,816,711 | B2 | 10/2020 | Yanai |
| 10,871,666 | B2 | 12/2020 | Saitoh et al. |
| 10,935,714 | B2 | 3/2021 | Woodgate et al. |
| 10,948,648 | B2 | 3/2021 | Ihas et al. |
| 10,955,715 | B2 | 3/2021 | Woodgate et al. |
| 10,976,578 | B2 | 4/2021 | Robinson et al. |
| 11,016,318 | B2 | 5/2021 | Robinson et al. |
| 11,070,791 | B2 | 7/2021 | Woodgate et al. |
| 11,073,735 | B2 | 7/2021 | Harrold et al. |
| 11,079,645 | B2 | 8/2021 | Harrold et al. |
| 11,092,851 | B2 | 8/2021 | Robinson et al. |
| 11,099,433 | B2 | 8/2021 | Robinson et al. |
| 11,109,014 | B2 | 8/2021 | Robinson et al. |
| 11,115,647 | B2 | 9/2021 | Woodgate et al. |
| 11,181,780 | B2 | 11/2021 | Robinson et al. |
| 11,187,945 | B2 | 11/2021 | Harrold et al. |
| 2010/0092784 | A1 | 4/2010 | Kamada et al. |
| 2012/0235891 | A1 | 9/2012 | Nishitani et al. |
| 2013/0162924 | A1 | 6/2013 | Sahouani et al. |
| 2013/0308185 | A1 | 11/2013 | Robinson et al. |
| 2017/0069236 | A1 | 3/2017 | Klippstein et al. |
| 2019/0064557 | A1 | 2/2019 | Yanai |
| 2019/0369323 | A1* | 12/2019 | Huang ................... G02F 1/1336 |
| 2020/0026114 | A1* | 1/2020 | Harrold ............... G02F 1/13725 |
| 2020/0142234 | A1 | 5/2020 | Iwasaki et al. |
| 2020/0292878 | A1 | 9/2020 | Sekiguchi et al. |
| 2020/0404139 | A1 | 12/2020 | Masuda et al. |
| 2021/0096412 | A1 | 4/2021 | Iwasaki et al. |
| 2021/0109270 | A1 | 4/2021 | Hoshino et al. |

FOREIGN PATENT DOCUMENTS

| | | |
|---|---|---|
| CN | 112334797 A | 2/2021 |
| DE | 600 22 081 T2 | 6/2006 |
| DE | 102019218286 A1 | 5/2021 |
| JP | H-11101964 A | 4/1999 |
| JP | 2005128212 A | 5/2005 |
| JP | 2008165201 A | 7/2008 |
| JP | 2008275976 A | 11/2008 |
| JP | 2009145776 A | 7/2009 |
| JP | 2009244356 A | 10/2009 |
| JP | 5566178 B2 | 8/2014 |
| JP | 2016027387 A | 2/2016 |
| JP | 2018200387 A | 12/2018 |
| JP | 6596101 B2 | 10/2019 |
| JP | 6641005 B2 | 2/2020 |
| JP | 6719552 B2 | 7/2020 |
| JP | 6719558 B2 | 7/2020 |
| JP | 6794422 B2 | 12/2020 |
| JP | 2007-155783 A | 6/2021 |
| JP | 7047405 B2 | 4/2022 |
| KR | 20180061717 A | 6/2018 |
| KR | 20190070843 A | 6/2019 |
| TW | I-485490 B | 5/2015 |
| WO | WO 01/40860 A1 | 6/2001 |
| WO | WO 2012/033583 A1 | 3/2012 |
| WO | WO 2015/121398 A1 | 8/2015 |
| WO | WO-2017195833 A1 | 11/2017 |
| WO | WO-2017199656 A1 | 11/2017 |
| WO | WO-2017208617 A1 | 12/2017 |
| WO | WO-2018003380 A1 | 1/2018 |
| WO | WO-2018164252 A1 | 9/2018 |
| WO | WO-2019017483 A1 | 1/2019 |
| WO | WO-2019103012 A1 | 5/2019 |
| WO | WO-2019111763 A1 | 6/2019 |
| WO | WO-2019131943 A1 | 7/2019 |
| WO | WO-2019132018 A1 | 7/2019 |
| WO | WO-2019172437 A1 | 9/2019 |
| WO | WO-2019189345 A1 | 10/2019 |
| WO | WO-2020004106 A1 | 1/2020 |
| WO | WO-2021054099 A1 | 3/2021 |
| WO | WO-2021060021 A1 | 4/2021 |
| WO | WO-2021060424 A1 | 4/2021 |
| WO | WO-2021060432 A1 | 4/2021 |
| WO | WO-2021060437 A1 | 4/2021 |
| WO | WO-2021210359 A1 | 10/2021 |

* cited by examiner

SWITCHABLE LIGHT FILTER AND USE THEREOF

PRIORITY CLAIM

The present application is a National Phase entry of PCT Application No. PCT/EP2021/076471, filed Sep. 27, 2021, which claims priority from German Patent Application No. 10 2020 006 110.9, filed Sep. 30, 2020, and German Patent Application No. 10 2021 112 947.8, filed May 19, 2021, the disclosures of which are hereby incorporated by reference herein in their entirety.

FIELD OF THE INVENTION

The invention is directed to a switchable light filter and use thereof.

BACKGROUND OF THE INVENTION

In recent years, great strides have been made in widening the visual angle in LCDs. However, there are often situations in which this very large viewing area of a display screen can be disadvantageous. Increasingly, information such as bank data or other personal information and sensitive data is also available on mobile devices, such as notebooks and tablets. Accordingly, people need to supervise viewing access to these sensitive data. They should be able to choose between a wide viewing angle—a public mode—for sharing information on their display with others, e.g., when viewing vacation photographs or for advertising purposes. On the other hand, they need a small viewing angle—a private mode—when they want to treat the displayed information confidentially.

A similar problem arises in the automotive industry, where the driver should not be distracted by image contents, e.g., digital entertainment programs, when the engine is running, but the passenger would like to view such images while driven. Consequently, there is a need for a display screen that can toggle between the corresponding display modes.

Add-on films based on microlouvers have already been used for mobile displays in order to achieve protection of visual data. However, these films were not switchable or toggleable; they always had to be manually applied first and then removed again subsequently. They also had to be carried separate from the display when not in use at a particular time. A further substantial drawback in the use of such louvered films is connected to the associated light losses.

U.S. Pat. No. 6,765,550 B2 describes such a protected view by means of microlouvers. The greatest disadvantage here is the mechanical removal and mechanical mounting of the filter and the light losses in protected mode.

U.S. Pat. No. 5,993,940 A describes the use of a film which has small strip-shaped prisms arranged uniformly on its surface in order to achieve a privacy mode, i.e., a limited viewing mode with a small viewing angle area. The development and production are quite cumbersome in terms of technology.

In WO 2012/033583 A1, switching between public view and restricted view is brought about by means of controlling liquid crystals between chromonic layers. There is light loss and the technical expenditure is quite high.

US 2012/0235891 A1 describes a very elaborate backlight in a display screen. According to FIGS. 1 and 15, not only is a plurality of light guides utilized but also further complex optical elements such as microlens elements 40 and prism structures 50 which reshape the light as it travels from the back illumination to the front illumination. This is expensive and technically complicated to implement and also involves light losses. According to the variant shown in FIG. 17 in US 2012/0235891 A1, both light sources 4R and 18 produce light with a narrow illumination angle, the light from the rear light source 18 first being transformed laboriously into light with a large illumination angle. This complex transformation sharply reduces brightness as already noted above.

According to JP 2007-155783 A, special optical surfaces 19 which are difficult to calculate and produce are used to deflect light in different narrow or broad areas depending on the incident angle of light. These structures resemble Fresnel lenses. Further, there are interference edges which deflect light in unwanted directions. Accordingly, it remains unclear whether or not meaningful light distributions can actually be achieved.

US 2013/0308185 A1 describes a special stepped light guide which emits light on a large area in various directions depending on the direction from which it is illuminated proceeding from a narrow side. Accordingly, in combination with a transmissive imaging display device, e.g., an LC display, a display screen can be produced that is switchable between a public viewing mode and a limited viewing mode. One of the drawbacks here consists in that the limited-view effect can only be produced for left and right or up and down, but not for left and right and up and down simultaneously as is needed for certain payment processes, for example. In addition to this, a residual light is also always still visible in the limited-view mode from blocked viewing angles.

WO 2015/121398 A1 by the present applicant describes a display screen with two modes of operation in which scattering particles are present in the volume of the corresponding light guide for toggling between operating modes. However, the scattering particles selected therein, which comprise a polymerizate, generally have the disadvantage that light is coupled out of both large areas so that about half of the useful light is emitted in the wrong direction, namely, toward the backlight, and cannot be recycled there to a sufficient extent because of the construction. Beyond this, the scattering particles of polymerizate which are distributed in the volume of the light guide can lead under certain circumstances, particularly at high concentrations, to scattering effects which diminish the privacy effect in the protected operating mode.

The technological approach of "electrical birefringence" is based on the idea of using the switchable liquid crystals of an additional LC panel to "filter" all of the light rays which do not exit the imaging layer at a determined emission angle. The disadvantages of this technology include the high additional expenditure of energy and the high cost, and the ±40° sweet spot, i.e., the best possible viewing position, is difficult to modify. The absorbance of the LC structures is also insufficient because the attenuation of the light intensity increases again for viewing angles greater than the sweet spot, and the light intensity for viewing angles greater than ±40° are as much as 3% of the maximum light intensity.

The common drawback of the methods and arrangement cited above is that they generally reduce the brightness of the basic display screen appreciably and/or require a complicated and expensive optical element for toggling between modes and/or lower the resolution in the freely viewed public mode and/or have visual artifacts in very high-resolution displays.

SUMMARY OF THE INVENTION

Therefore, it is the object of the invention to describe a switchable light filter having an optical element in which light incident in the optical element is transmitted or is partially or entirely absorbed depending on its incident direction and its polarization properties, but not depending on its position. The transmission of light is to be influenced in an angle-dependent manner—optionally perpendicularly with reference to a sitting or standing observer—by means of the switchable light filters which utilize the optical element, enabling toggling between at least two operating states. In particular, angular limitations in transmission in determined directions can be toggled.

The optical element or systems based thereon shall be implementable at a low cost and, in particular, shall be universally useable with different types of display screens to enable toggling between a protected view, i.e., a limited viewing mode, provided at least in horizontal direction with reference to a standing or sitting observer, and a public viewing mode. At the same time, the resolution of such a display screen shall not be significantly reduced.

This object is met in a first embodiment by a switchable light filter which comprises a first optical element which, in itself, is not switchable. The optical element itself comprises a first layer or a first layer and a plurality of further layers, preferably more than five layers. Each of the layers comprises a material with a plurality of light-absorbing transition dipole moments. At least in a first state, each transition dipole moment is oriented, with a tolerance of 10° at the maximum, parallel to a first preferential direction selectable for the first optical element or fluctuates around this, so that light which is incident in the first optical element is transmitted or at least partially absorbed depending on its incident direction relative to the layers and depending on its polarization state.

The transition dipole moment—also known as transition matrix element—is a quantum-mechanical vector quantity and associates molecules or solids with a specific transition between an initial state—generally the basic state—and a final state—generally an excited state—of a system, i.e., of an atom, and corresponds to the electric dipole moment which is related to this transition. The direction of the vector defines the polarization of the transition which in turn determines how the system interacts with an electromagnetic wave of a given polarization, for example, absorbs light of the corresponding polarization direction during the transition from the basic state to the excited state. The amount of the vector corresponds to the strength of the interaction or to the transition probability.

The first preferential direction corresponds to that orientation of the transition dipole moments with a given propagation direction of light in which the absorption is identical for any polarization directions of the light. The preferential direction is the orientation of the transition dipoles in the medium, i.e., the absorption is minimal for the propagation in the medium in this direction in a view-protected operating mode which will be described later.

Dichroic dyes or dye mixtures, for example, which are combined with a carrier material which does not impair properties, for example, with liquid crystals or polymers, are contemplated as materials within the meaning of the invention which contain orientable transition dipole elements. Each of the layers can contain only one dye, for example, these dyes differing from one another pairwise with respect to the different layers. However, a plurality of dyes, i.e., dye mixtures, can also be contained within a single layer.

The switchable light filter further comprises a polarization filter, which is arranged upstream or downstream of the first optical element considered in incident direction, and means for selectively generating a first electric field or a second electric field, such as an electric field generator. A liquid crystal layer is arranged between the first optical element and the polarization filter, this liquid crystal layer being acted upon by the first electric field or the second electric field and, depending thereon, influences the polarization state of light passing through it. The switchable light filter can be operated in at least two operating modes. In a first operating mode B1 in which the first electric field is applied and with a first sub-operating mode B1H and a second sub-operating mode B1V, on the one hand, at least 24% of unpolarized light which is incident in the switchable light filter parallel to the first preferential direction is transmitted and, on the other hand, at least 85% of unpolarized light which is incident in the switchable light filter at an angle of greater than 30° to the first preferential direction is absorbed, this absorption taking place exclusively in a first direction in the first sub-operating mode B1H and exclusively in a second direction perpendicular to the first direction in the second sub-operating mode B1V. In contrast, in a second operating mode B2 in which the second electric field is applied and with the first sub-operating mode B1H and the second sub-operating mode B1V, on the one hand, at least 24% of unpolarized light which is incident in the switchable light filter parallel to the first preferential direction is transmitted and, on the other hand, at least 85% of unpolarized light which is incident in the switchable light filter 5 at an angle of greater than 30° to the first preferential direction is absorbed, this absorption taking place exclusively in the second direction in the first sub-operating mode B1H and exclusively in the second direction perpendicular to the first direction in the second sub-operating mode B1V, so that the directions of absorption differ by 90°, respectively, for each of the two sub-operating modes B1H, B1V for the first operating mode B1 and the second operating mode B2 and therefore also for both operating modes B1 and B2. The absorption takes place in only one direction exclusively, i.e., the light is transmitted in the other respective direction.

In the first operating mode B1, the absorption can take place, for example, in horizontal direction with reference to a sitting or standing observer, or generally at eye level, in sub-operating mode B1H and can take place in vertical direction, also referring to a sitting or standing observer or generally at eye level, in sub-operating mode B1V. A straight line connecting both eyes then defines the horizontal direction and corresponds to the first direction, while the vertical direction is perpendicular to the horizontal direction and corresponds to the second direction. Correspondingly, in the second operating mode B2, the absorption takes place in vertical direction in sub-operating mode B1H and in horizontal direction in sub-operating mode B1V.

The configuration of this first embodiment of a switchable light filter can change between operating modes B1 and B2 and between B1H and B1V, respectively, by rotating the polarization filter 90 degrees.

In this regard, it is possible, for example, that either the first electric field or the second electric field describes a field-free state and the other respective electric field has an absolute field strength of greater than zero, e.g., 0.5 MV/m. Depending on the configuration of the first optical element and of the polarization filter, the field-free state can mean that operating mode B1 or B1H is in effect. However, it is also possible that operating mode B2 or B1V is in effect in the field-free state.

Accordingly, in combination with an imaging display unit, the switchable light filter of this first embodiment allows, for example, toggling between a protected view in vertical direction and a protected view in horizontal direction (in operating mode B1, for example, protected up/down in sub-operating mode B1V versus protected left/right in sub-operating mode B1H). In a laptop, for example, this would mean that a user can look at contents in sub-operating mode B1V of operating mode B1 together with other persons located next to the user and at substantially the same eye level as the user, whereas in sub-operating mode B1H, the persons located to the side of the user cannot view the image contents.

In effect, in operating mode B1, the emission angle range in which light is emitted is cropped, i.e., reduced, vertically in sub-operating mode B1V and horizontally in sub-operating mode B1H. This association is reversed in operating mode B2. Both operating modes have an emission angle range that is limited in one direction.

The switchable light filter of this first embodiment can vary in construction. Some important constructional variants are given in the following Table 1. The first component mentioned in each instance faces an observer and is then followed by the other components. In this case, the abbreviation "L/R" means that the optical effect is active in the horizontal effect (with the horizontal direction already defined above). For the polarization filter, this means that it transmits linearly polarized light horizontally and (substantially) absorbs vertical linearly polarized light. Correspondingly, for the polarization filter "U/D" means that it transmits vertically linearly polarized light and (substantially) absorbs horizontally linearly polarized light. In contrast, for the resulting effect of this switchable filter in combination with an imaging display unit which can be arranged in front of or behind the switchable filter, the abbreviation "L/R" means that the protected view effect acts horizontally, that is, prevents viewing from left and right. This ultimately corresponds to operating mode B1 in sub-operating mode B1H of the switchable filter. Analogously, for the switchable filter in combination with an imaging display unit, "U/D" means that the protected view effect acts vertically, i.e., viewing from above and below is prevented. This corresponds to operating mode B1 in sub-operating mode B1V of the switchable filter.

TABLE 1

| Construction | Field-free (operating mode B1): effect in combination with an imaging display unit | Field present (operating mode B2): effect in combination with an imaging display unit |
| --- | --- | --- |
| Polarization filter (U/D) liquid crystal layer optical element | Protected view effect (L/R)-B1H | Protected view effect (U/D)-B1H |
| Polarization filter (L/R) liquid crystal layer optical element | Protected view effect (U/D)-B1V | Protected view effect (L/R)-B1V |
| Optical element liquid crystal layer polarization filter (L/R) | Protected view effect (U/D)-B1V | Protected view effect (L/R)-B1V |
| Optical element liquid crystal layer polarization filter (U/D) | Protected view effect (L/R)-B1H | Protected view effect (U/D)-B1H |

In the examples shown in Table 1, the liquid crystal layer is a nematic liquid crystal layer which is rotated 90 degrees, i.e., the preferred orientation of the liquid crystals at the two surfaces which induce the orientation and define the liquid crystal layer is orthogonal to one another. In the last line of the table, the incident light is polarized linearly along the vertical direction (U/D) in state B1 by means of the polarizer. Subsequently, the linear polarization is rotated 90 degrees through the liquid crystal layer and is then oriented horizontally (L/R). The smaller the angle between the horizontal direction and the incident direction, the lower the transmission of light. This causes the protected view along the horizontal direction (L/R). Analogous relationships pertain in the case of state B2, but the 90-degree polarization is omitted.

It should be noted here once again that the "U/D" protected view effect allows a normal view for a plurality of observers in many practical instances when these observers look at the imaging display unit from the side at approximately the same height.

The object of the invention is also met by a second embodiment of a switchable light filter. This light filter likewise contains a first optical element which is constructed similar to the first optical element of the first embodiment but is switchable and additionally has the feature that the transition dipole moments in each of the layers can be varied with respect to their orientation and/or their amount between the first state and at least a second state in order to alternatively put the respective layer in at least two different states. A polarization filter is also arranged upstream or downstream of the first optical element in this case. The switchable light filter according to the second embodiment further comprises means for selectively generating a first electric field or a second electric field. For the first optical element, the first state is produced by applying the first electric field, and the second state is produced by applying the second electric field.

The first electric field is applied in a first operating mode B1, and the transition dipole moments of the layers of the first optical element are oriented along the first preferential direction. Typically, the electric fields for this switchable light filter and for all other switchable light filters described in the preceding or yet to be described are generated with square wave voltage $V_{RMS}$<10 V and a frequency of 1 kHz. The first operating mode B1 includes a first sub-operating mode B1H and a second sub-operating mode B1V. In the first operating mode B1, on the one hand, at least 24% of unpolarized light which is incident in the switchable light filter parallel to the first preferential direction is transmitted and, on the other hand, at least 85% of unpolarized light which is incident in the switchable light filter according to the second embodiment at an angle of greater than 30° to the first preferential direction is absorbed, this absorption taking place exclusively in a first direction in the first sub-operating mode B1H and exclusively in a second direction perpendicular to the first direction in the second sub-operating mode B1V.

In a second operating mode B3, the second electric field is applied and the transition dipole moments of the layers of the first optical element (1) are oriented parallel to a surface of the polarization filter and perpendicular to a transmission direction of the polarization filter. In this case, at least 24% of unpolarized light which is incident in the switchable light filter at any angle to the first preferential direction is transmitted.

In this case again it is also possible, for example, that either the first electric field or the second electric field describes a field-free state and the other respective electric field has an absolute field strength of greater than zero, e.g., 0.5 MV/m. Depending on the embodiment of the optical element and of the polarization filter, the field-free state can mean that operating mode B3 is in effect. However, it is also possible that operating mode B1 and one of the sub-operating modes B1H or B1V is in effect in the field-free state.

Accordingly, if the first direction is identified with the horizontal direction and the second direction is identified with the vertical direction analogous to the first embodiment, the switchable light filter of this second embodiment in combination with an imaging display unit allows toggling between a protected view in vertical direction—shielded from view up/down in sub-operating mode B1V by a limited emission angle range—or in horizontal direction—shielded from view left and right in sub-operating mode B1H by a limited emission angle range—on the one hand and no protected view effect in operating mode B3 in which the emission angle range is not limited and is appreciably larger than in operating mode B1 with the two sub-operating modes B1V and B1H on the other hand. In contrast to the first embodiment, operating mode B3 in this instance realizes a viewing mode that is free in all directions.

In a third embodiment, the switchable light comprises a first optical element and a second optical element which are not switchable themselves. Each of the two optical elements, whose construction and manner of functioning will be described in the following, comprises a first layer or a first layer and a plurality of, preferably more than five, layers. Each of the layers comprises a material with a plurality of light-absorbing transition dipole moments. At least in a first state, each transition dipole moment is oriented, with a tolerance of 10° at the maximum, parallel to a first preferential direction selectable for the first optical element and to a second preferential direction selectable for the second optical element or fluctuates around these. The first preferential direction and second preferential direction differ from one another by less than 40°, preferably by less than 20°, particularly preferably by less than 10°, which includes the case where they can also be identical, that is, differ from one another by 0°. Light which is incident in the first optical element or second optical element is transmitted or at least partially absorbed depending on its incident direction relative to the layers and depending on its polarization state.

A liquid crystal layer is arranged between the first optical element and the second optical element. The liquid crystal layer influences the polarization state of light passing through it depending on a first electric field or second electric field acting on the liquid crystal layer. The switchable light filter in the third embodiment thereof correspondingly also comprises means for selectively generating the first electric field or second electric field, for example, transparent ITO (indium tin oxide) electrodes. It further comprises, electively, either a polarization filter, which is then arranged above or below a unit comprising the two optical elements, or no polarization filter.

In case a polarization filter is present, in a first operating mode B1 in which the first electric field is applied and with a first sub-operating mode B1H and a second sub-operating mode B1V, on the one hand, at least 24% of unpolarized light which is incident in the switchable light filter parallel to the first preferential direction or second preferential direction is transmitted and, on the other hand, at least 85% of unpolarized light which is incident in the switchable light filter at an angle of greater than 30° to the corresponding preferential direction is absorbed, this absorption taking place exclusively in a first direction in the first sub-operating mode B1H and exclusively in a second direction perpendicular to the first direction in the second sub-operating mode B1V. Either the first direction or the second direction is perpendicular to a polarization direction of the polarization filter.

For the alternative case in which there is no polarization filter, in a first operating mode B1 in which the first electric field is applied, at least 24% of unpolarized light which is incident in the switchable light filter at any angle is transmitted.

Regardless of whether or not there is a polarization filter, in a second operating mode B2 in which the second electric field is applied, at least 24% of unpolarized light which is incident in the switchable light filter parallel to the first preferential direction or to the second preferential direction is transmitted on the one hand, and at least 85% of unpolarized light which is incident in the switchable light guide at an angle of greater than 30° to the corresponding preferential direction is absorbed on the other hand.

As has already been mentioned, the two preferential directions of the two optical elements can be identical or can differ from one another by up to an angle of 40°, preferably 20° or only 10°. For example, if both preferential directions are parallel to the surface normal of the light filter constructed as a layer body, the emission angle range which corresponds to a visual angle range is limited to the area around the surface normal, since the transmission in the preferential direction is at a maximum in each instance. Therefore, when one or both preferential directions are tilted, the angle at which the transmission is at a maximum, and correspondingly also the limited visual angle range, is also tilted.

In the case where unpolarized light is incident in the first optical element and a polarization rotation of 90° takes place subsequently through the liquid crystal layer in the field-free state, the visual angle range is limited to the left, right, top and bottom. If the electromagnetic field is now switched on, no rotation of the polarization of the light takes place and there is also no limiting of the visual angle range, but the light perpendicular to the projection of the light incidence vector on the light incidence plane is polarized. If the light which is incident in the first optical element is linearly polarized through a polarizer, a limiting of the visual angle toward the top, bottom, right and left takes place in the field-free state. If a field is now applied, the visual angle is limited parallel to the linear polarization of the light which is incident in the first optical element.

Accordingly, the switchable light filter of the third embodiment in combination with an imaging display unit allows toggling either between a two-sided protected view—for example, a protected view up and down in sub-operating mode B1V—and a four-sided protected view—the visual angle range is limited in all four directions top, bottom, left and right in operating mode B2—when a polarization filter is provided or, if no polarization filter P is present, allows toggling either between free viewing in all directions with unlimited visual angle range in operating mode B1 and a four-sided protected view in operating mode B2. With additional waveplates, influence can be exerted on the polarization states. For example, if a quarter-wave plate is used, linearly polarized light is converted into circularly polarized light and toggling can be carried out between four-sided protected viewing and unrestricted viewing.

In this regard, it is possible, for example, that either the first electric field or the second electric field describes a field-free state and the other respective electric field has an absolute field strength of greater than zero, e.g., 0.5 MV/m. Depending on the configuration of the two optical elements, the field-free state can mean that operating mode B2 is in effect. However, it is also possible that one of operating modes B1— without polarizer—or sub-operating modes B1H, B1V—with polarizer—is in effect in the field-free state.

In a fourth embodiment, the switchable light filter also comprises a first optical element and a second optical element which, unlike the third embodiment, are switchable. Each of the two optical elements comprises a first layer or a first layer and a plurality of further layers, preferably more than five layers. Each of the layers comprises a material with a plurality of light-absorbing transition dipole moments. At least in a first state, each transition dipole moment is oriented, with a tolerance of 10° at the maximum, parallel to a first preferential direction selectable for the first optical element and to a second preferential direction selectable for the second optical element or fluctuates around these. Light which is incident in the first optical element or second optical element is transmitted or at least partially absorbed depending on its incident direction relative to the layers and depending on its polarization state. In this case, in contrast to the third embodiment, the transition dipole moments in each of the layers can be varied with respect to their orientation and/or their amount between the first state and at least a second state in order to alternatively put the respective layer in at least two different states.

Also in the fourth embodiment of the switchable light filter, this switchable light filter comprises means for selectively generating a first electric field or a second electric field. For each of the two optical elements, the first state is generated by applying the first electric field and the second state is generated by applying the second electric field. Both electric fields are applied simultaneously to the two optical elements. However, one of the two fields can again indicate a field-free state. An optical anisotropic layer which rotates a polarization direction of light passing through the alignment layer by 90° is arranged between the two optical elements. This alignment layer comprises, for example, a uniaxially rotated material—analogous to a TN (twisted nematic) cell, also known as a Schadt-Helfrich cell—and/or of an optically active material.

A polarization filter or no polarization filter, as desired, can be arranged above or below the two optical elements. The polarization filter is not necessary but can improve the performance capability of the switchable light filter. The polarization of the polarization filter and that of the incident light must be congruent.

In this fourth embodiment, in a first operating mode B1 in which the first electric field is applied, at least 24% of unpolarized light which is incident in the switchable light filter at any angle relative to the switchable light filter is transmitted. In the first operating mode B1, the transition dipole moments of the two optical elements are aligned perpendicular to one another and, in case a polarization filter is present, polarization filter transition dipole elements of the polarization filter are aligned parallel to the transition dipole moments of the switchable optical element located closest to the polarization filter. In contrast, in a second operating mode B2 in which the second electric field is applied, on the one hand, at least 24% of unpolarized light which is incident in the switchable light guide parallel to the first preferential direction or second preferential direction is transmitted and, on the other hand, at least 85% of unpolarized light which is incident in the switchable light guide at an angle of greater than 30° to the corresponding preferential direction is absorbed. In operating mode B2, the transition dipole moments of the polarization filter, if present, and the transition dipole moments of the switchable optical element located closest to the polarization filter are oriented perpendicular to one another, and the transition dipole moments of the two optical elements are oriented parallel to one another.

Accordingly, the switchable light filter of this fourth embodiment in combination with an imaging display unit allows toggling between free viewing in all directions in the public or free operating mode B1 and a four-sided protected view with respect to a preferential direction—up, down, right and left—in the private or limited operating mode B2 in a visual angle range or emission angle range which is limited relative to operating mode B1. When unpolarized light impinges on the switchable light filter in the private operating mode B2, light which is not incident approximately parallel to the preferential directions—which are preferably aligned in parallel in operating mode B2— is absorbed. In the public operating mode B1, linearly polarized light is transmitted.

In a preferred construction of the first or third embodiment, at least one polarization compensation layer is arranged upstream and/or downstream of the liquid crystal layer. In this way, it is possible to compensate for the fact that the change in polarization of perpendicularly incident light on the one hand and of light incident under an angle to the surface normal on the other hand differs.

The preferential directions preferably form an angle between 0° and 45° to a surface normal of the first layer. This covers the usual visual angle, for example, on a display screen with the switchable light filter.

For certain cases of application, the switchable light filter in any of the configurations mentioned above can be divided into a plurality of separately switchable segments so that localized toggling between the respective possible operating states is made possible. In combination with an imaging display unit, this would mean that, for example, only a portion of the image area can be toggled between a private mode for protected view and a public mode with no protected view effect, i.e. for free viewing, while the complementary portion of the image area is permanently in a privacy mode or not in a privacy mode. There can even be a plurality of such segments geometrically separate from one another which can be toggled between the operating modes separately or jointly.

Further, each of the layers of the first optical element and/or of the second optical element, if any, is preferably constructed non-periodically. This reduces the occurrence of visual artifacts which an observer of a corresponding display screen could perceive as annoying, for example, Moiré stripes.

The invention acquires special significance by combining a switchable light filter, described above, with an imaging display unit to form a display screen. In addition to a switchable light filter such as that described above, a display screen of this kind comprises an imaging display unit arranged downstream or upstream of the switchable light filter from the perspective of an observer. The operating modes of the switchable light filter described above can easily be transferred to the display screen so that this display screen can also be operated in the different operating modes mentioned above depending on the embodiment of the switchable light filter, for example, at least in a first operating mode for a public viewing mode which is not limited in horizontal direction and with non-limited emission angle range or visual angle range and a private viewing mode which is limited in horizontal direction and with an emission angle range or visual angle range that is limited in horizontal direction relative to the public viewing mode, so that observers positioned outside of this limited visual angle range can discern image contents displayed on the display screen only in the public viewing mode.

The imaging display unit advantageously corresponds to an LCD panel whose one polarization filter corresponds to the polarization filter of the switchable light filter. This can be the front or back polarizer in the LCD construction. Moreover, the switchable light filter can advantageously be arranged between the LCD panel and the backlight thereof in order to toggle between a first operating state for a free viewing mode and a second operating state for a limited viewing mode because the light of the backlight is sometimes focused and sometimes not focused in horizontal direction because of the switchable light filter, for example, when toggling in horizontal direction. In the present instance, "focusing" does not mean focusing in the manner of lenses but rather a narrowing of the emission area or transmission area via the angles.

Alternatively, the imaging display unit can be an OLED, a field emission display (SED), a field emission display (FED), a micro-LED display or a vacuum fluorescent display (VFD) in front of which a switchable light filter is arranged. Since the switchable light filter operates independent from the type of imaging display unit, any other type of display screen is also contemplated.

Such a display screen is advantageously used in a mobile device, a motor vehicle, aircraft or watercraft, in a pay terminal or in an access system. Toggling between the aforementioned operating modes can then be carried out in order to protect sensitive data, i.e., to make it visible to only one observer or, alternatively, to display image contents to a plurality of observers simultaneously.

The above-described optical element according to the invention which meets the above-stated object and can be employed as first optical element and/or second optical element particularly in the four embodiments of the switchable light filter described above will be described in more detail in the following and possible embodiment forms will be shown.

Such an optical element comprises a first layer, or a first layer and a plurality of further layers, preferably more than five layers. Within the meaning of the invention, each of the layers can correspond to a molecule layer, for example. However, they can also be mechanically separate layers of a suitable material. Each layer comprises a material with a plurality of light-absorbing transition dipole moments. Possible materials have already been mentioned in the introductory part in which the optical element of the switchable light filter is described. At least in a first state, each transition dipole moment is oriented, with a tolerance of 10° at the maximum, parallel to a selectable preferential direction or fluctuates around this, so that light which is incident in the optical element is transmitted or at least partially—up to and including completely—absorbed depending on its incident direction relative to the layers and depending on its polarization state. The preferential directions preferably form an angle between 0° and 45° to a surface normal of the first layer.

The extinction, i.e., the absorption, of the light depends on the absolute number of transition dipole moments—and, therefore, inherently also on the layer thickness in which the transition dipole moments are located—and the orientation between the transition dipole moment and the polarization of the incident light relative to one another. The density of the aforementioned transition dipole moments, their strength or the refractive index in the layers of the optical element may vary depending on implementation. In the case of a passive optical element, i.e., an optical element that is not switchable, the volume density of the transition dipoles can approach 100%.

To simplify modeling of the transmission, it is assumed that the transition dipole moments in the optical element are oriented parallel to the plane of incidence of the light on the optical element and the preferential direction corresponds to the perpendicular bisectors of the optical element. The plane of incidence does not refer here to the surface of the optical element but rather to a plane in which the propagation direction of the light wave extends. The surface of the optical element and the plane of incidence form a right angle. The light wave has a transverse-magnetic oscillation component and a transverse-electric oscillation component as transverse wave, both of which are perpendicular to one another and to the propagation direction. Light which is incident on the optical element is initially unpolarized in its totality of light waves, i.e., the oscillation directions of the transverse-electric components and, therefore, also of the transverse-magnetic components are randomly distributed. When the transition dipole moments which are oriented in this way perpendicular to the surface of the optical element arrive at the surface of the optical element, the light interacts with the optical element or transition dipole moments of the material contained therein and is polarized. In so doing, the oscillation components lying in the plane of incidence are absorbed. Light which is accordingly polarized parallel to the plane of incidence, i.e., transverse magnetic polarized or P-polarized, is absorbed, whereas light which is polarized perpendicular to the plane of incidence—that is, parallel to the surface of the optical element—i.e., transverse electric polarized or S-polarized, is completely transmitted. Accordingly, unpolarized light which does not pass the optical element parallel to transition dipole moments is at least partially S-polarized when passing through the optical element with transition dipole moments which are oriented parallel to the plane of incidence of the light. If the preferential direction does not correspond to the perpendicular bisectors, O-polarization (ordinary polarization) should be considered instead of S-polarization, and E-polarization (extraordinary polarization) should be considered instead of P-polarization.

This characteristic is key in all of the embodiments of the invention and represents a substantial inventive means-effect relationship. In the following, the transmission of P-polarized light is modeled with a radiated intensity $I_0(\alpha)$. The transmission of light through an absorbent layer is described by the Beer-Lambert law:

$$I(\alpha)=I_0(\alpha)e^{-d(\alpha)N\sigma_{abs}(\alpha)},$$

where $\alpha$ is the propagation direction relative to the surface normal, $d(\alpha)$ is the optical path length depending on the propagation direction, N is the quantity of absorbent molecules and $\sigma_{abs}(\alpha)$ is the absorption cross section depending on the angle of incidence. Using Snell's law of refraction, the angle of propagation in the medium a can be calculated from the angle of incidence ft. From the equation of the transition dipole moment and the change in the optical path, this gives:

$$I(\alpha)=I_0(\alpha)e^{-d/N\sigma_{abs}sin(\alpha)2}.$$

Depending on the case of application, each of the layers is constructed periodically or aperiodically with respect to its structure. The non-periodic construction is advantageous with respect to preventing visual artifacts.

In a preferred embodiment, every transition dipole moment is oriented in the respective preferential direction within a tolerance of 10° at the maximum around the latter. The highest transmittance then also lies along the preferential direction. At least two such preferential directions in a selectable plane—generally in one of the layers—also preferably differ by more than 10°. This makes it possible to define a plurality of preferential directions in one layer, all of which can be oriented to a point in space, for example, an observer. This differing orientation can be achieved by means of corresponding adaptations of the material characteristics within the layers, for example, by means of photoalignment. To this end, liquid crystals are combined with photoreactive substances. Radiating polarized light simultaneously aligns the molecules and triggers a photoreaction. The orientation of the molecules can be influenced by controlling the polarization.

The microlouver filters (also called "view control filter" [VCF] or "light control filter [LCF]) described in the prior art make use of geometrical optics. Virtually all of the incident light which propagates under large angles relative to a defined direction is absorbed by the alternating periodic arrangement of transparent layers and absorbent layers. In that case, the position of the absorber is controlled. In contrast, in the optical element according to the invention, the transmission of light changes with different propagation directions because the absorption cross section of the molecules changes with the propagation direction. Accordingly, in the invention it is the orientation of the absorbers, not the position, that is controlled. In other words, the invention is based on a direction-dependent absorption of light rays during passage through an optical element according to the invention, namely, essentially independent from the position of the light rays—except for the preferential directions given for the transition dipole moments. This applies to non-switchable optical elements according to the invention like those described above as well as to switchable embodiments to be described in the following.

To enable switching of the optical effect of the optical element according to the invention, i.e., for a switchable optical element, the transition dipole moments in every layer can be varied with respect to their orientation and/or their amount between the first state and at least a second state so that the respective layer can be brought alternatively into at least two different states. Possible embodiments of a switchable optical element or of each layer therein are based, for example, on liquid crystals and/or dyes or dye mixtures which can be arranged in a so-called vertical alignment cell or in a liquid crystal cell with homogeneous alignment at the surfaces and can be rotated therein between at least two states. In so doing, the light-absorbing transition dipole moments are also rotated and can accordingly take on at least two effect states. It is conceivable particularly in such embodiments that more than two states, e.g., three or eight states, with different respective optical effects are achieved. Other embodiments of liquid crystal cells are also possible. To this end, electric fields are used in particular in order to rotate the liquid crystals. It is possible, for example, that either a first electric field or a second electric field describes a field-free state, the other respective electric field having an absolute field strength of greater than zero, e.g., 0.5 MV/m.

A first such state corresponds to the conditions described above and at least a second state differs from this, i.e., has at least one other preferential direction.

In such active, i.e., switchable, optical elements, volume densities of the transition dipole moments between 0.1% and 90% based on liquid crystals are conceivable. Alternatively, configurations of a switchable optical element or of each layer therein in which the transition dipole moments are embedded in a liquid which is subjected to an electrowetting process are contemplated. The density of the transition dipole moments in particular, but not exclusively, can be varied in this way.

Further, it is possible that the optical element is divided into a plurality of separately switchable segments so as to enable local toggling between the at least two different states. Accordingly, as regards switchability with at least two states, it is practicable in particular that the respective local transmission maxima between the at least two states lie in different directions, respectively.

Further, the respective preferential direction of a transition dipole moment is preferably selectable depending on its position in the respective layer.

In a further preferred embodiment of the optical element, every layer is divided along a selectable reference line on the respective layer into different regions, and every region can have its own regional preferential direction selected for it which applies to all of the transition dipole moments of the corresponding layer located within a region. All of the regional preferential directions differ pairwise and face in direction of an observer to within a tolerance of ±10° at the maximum. Accordingly, all of the transition dipole moments within a layer and within each region applicable to this layer are oriented in each instance parallel to the applicable preferential direction with a tolerance of ±10° at the maximum. With respect to structure, each of the layers is advantageously constructed non-periodically, which reduces or prevents the occurrence of annoying visual artifacts. This arrangement has the advantage that the observer perceives the display screen in the restricted viewing mode as homogeneously illuminated. Because of the dependency of luminous density on the visual angle, the observer perceives the display screen as inhomogeneous when the alignment of the transition dipole moments is constant over the entire surface area of the filter.

Simple possibilities for producing an optical element according to the invention as described above consist in producing the optical element by laminating a plurality of polymer film polarizers. It is then formed as a laminate of layers of polymer film polarizers. Alternatively or in combination, the optical element can also be produced by photoalignment of molecules or particles.

The material of the optical element preferably contains at least one dye, preferably a dichroic dye mixture. The at least one dye comprises dye molecules. A transition dipole or transition dipole moment is advantageously associated with each dye molecule, i.e., every dye molecule corresponds to a transition dipole or transition dipole moment. In LC dye mixtures, a dye typically has, for example, a mass fraction of 0.01% to 10%, preferably 0.1% to 5%, of the material of the respective layers. The thickness of the layers preferably ranges from 0.2 µm to 50 µm, preferably from 0.5 µm to 20 µm, inclusive. The dyes or dye mixtures may vary between the different layers.

Further, it is possible that the material of the optical element contains liquid crystals and/or is mixed with liquid crystals. This may also vary layer by layer when there are a plurality of layers.

For every layer, a mixture of liquid crystals with at least one dye, particularly with at least one dichroic dye mixture, is the preferred configuration. The following are contemplated as dichroic dyes or dye mixtures, for example: azomethine dyes, indigoid and thioindigoid dyes, merocyanines, azulenes, quinophthalone dyes, perylene dyes, phthaloperine dyes, dioxazine dyes, triphenodioxazine dyes, quinoxaline dyes, triazine dyes, tartrazine, azo dyes and anthraquinone dyes. The production of a liquid crystal dye mixture is described, for example, in U.S. Pat. No. 4,695,131 A. Further, the surfaces outwardly terminating the layers are preferably treated, for example, brushed, in order to achieve a homogeneous surface alignment of the transition dipole moments or liquid crystals, if any.

Generally, a polarization filter can advantageously be located in front of or behind the optical element in viewing direction, particularly when used in a switchable light filter. The polarization filter is helpful for determining or analyzing the polarization characteristics of the light passing through the optical element and should preferably always be present. The maximum transmission of the optical element is then generally given in directions parallel to the polarization direction of the polarization filter. It is also possible for two such polarization filters to be provided. These polarization filters are then arranged in front of and behind an optical element in viewing direction and are aligned substantially parallel to one another with respect to their linear polarization direction so that the privacy effect in the limited viewing mode can be improved.

Therefore, an illumination device with an optical element such as that described above also lies within the scope of the invention. Such an illumination device can be operated in at least two types of operation: one operating type B1 for a free viewing mode and one operating type B2 for a limited viewing mode. The limited viewing mode differs from the free viewing mode in that light is emitted in direction of an observer in an angular area that is limited compared to the free viewing mode. An observer located outside of the limited angular area does not see any light coming from the illumination device—this also applies to a display screen which will be described later—whereas, in the free viewing mode, the observer discerns light coming from the illumination device—or from a display screen—provided the observer is located in the inherently limited emission angle range of the illumination device or of the display screen in the free viewing mode which is appreciably larger than the emission angle range in the limited viewing mode. The limiting can be carried out in a plurality of spatial directions depending on the application, e.g., up, down, right and/or left.

The illumination device comprises a two-dimensionally extensive backlight which contains an optical element such as that described at length above and which emits light. It comprises a plate-shaped light guide which is located in front of the backlight in viewing direction and which has at least one out-coupling element on at least one of the large surfaces and/or within its volume, the light guide being at least 40%, preferably at least 70%, transparent to the light emanating from the backlight. Illuminants are arranged laterally on at least one narrow side of the light guide. Further, a linear polarization filter is arranged in front of the backlight or in front of the light guide in viewing direction so that light emanating from the backlight and passing through the polarization filter is limited with respect to its propagation directions. In operating mode B2, the backlight is switched on and the illuminants are switched off. In operating mode B1, at least the illuminants are switched on, i.e., in operating mode B1 it does not matter if the backlight is on or off.

Lastly, as has already been stated, the above-described element can also be used in a display screen which can be operated in the at least two operating modes, B1 for a free viewing mode and B2 for a limited viewing mode, already mentioned above in connection with the illumination device. Such a display screen comprises a two-dimensionally extensive backlight which contains an optical element, described above, and which emits light. Further, the display screen comprises a plate-shaped light guide which is located in front of the backlight in viewing direction and which has out-coupling elements on at least one of the large surfaces and/or within its volume, the light guide being at least 40%, preferably at least 70%, transparent to the light emanating from the backlight. Illuminants are arranged laterally on at least one narrow side of the light guide. Further, a linear polarization filter is arranged in front of the backlight or in front of the light guide in viewing direction so that light emanating from the backlight and passing through the polarization filter is limited with respect to its propagation directions.

Further, a transmissive imaging display device is arranged upstream of the light guide in viewing direction. The polarization filter can be arranged in the imaging display device and, in particular, can be part of this imaging display device as is the case in LC displays, for example. In operating mode B2, the backlight is switched on and the illuminant is switched off. In operating mode B1, at least the illuminants are switched on, i.e., in operating mode B1 it does not matter if the backlight is on or off.

More broadly, the invention also extends to a display screen which comprises at least one optical element as described above or an arrangement as described above and an imaging display unit arranged downstream or upstream of the optical element as seen from the perspective of an observer. The imaging display unit advantageously corresponds to an LCD panel whose one polarization filter corresponds to the polarization filter described above. This may refer to the front or back polarizer in the LCD construction. Alternatively, the imaging display unit can be an OLED, a field emission display (SED), a field emission display (FED), a micro-LED display or a vacuum fluorescent display (VFD) in front of which an optical element is arranged. Since the optical element operates independent from the type of imaging display unit, any other type of display screen is also contemplated. Such a display screen is advantageously used in a mobile device, a motor vehicle, aircraft or watercraft, in a pay terminal or in an access system. In case of a switchable optical element, toggling between the aforementioned operating modes can then be carried out in order to protect sensitive data, i.e., to make it visible to only one observer or, alternatively, to display image contents to a plurality of observers simultaneously. Further, a switchable or non-switchable optical element can be used in the described embodiments together with a static image or also a dynamic imaging display unit such as an LCD panel, for example, in order to make advertising content visible only in a limited viewing area.

The performance capability of the invention is basically retained when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as restrictive. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various figures are designated by the same reference numerals and not mentioned repeatedly so as to prevent repetition. The drawings show.

DETAILED DESCRIPTION OF THE DRAWINGS

The drawings are not to scale and are merely schematic depictions.

Figure 1A:
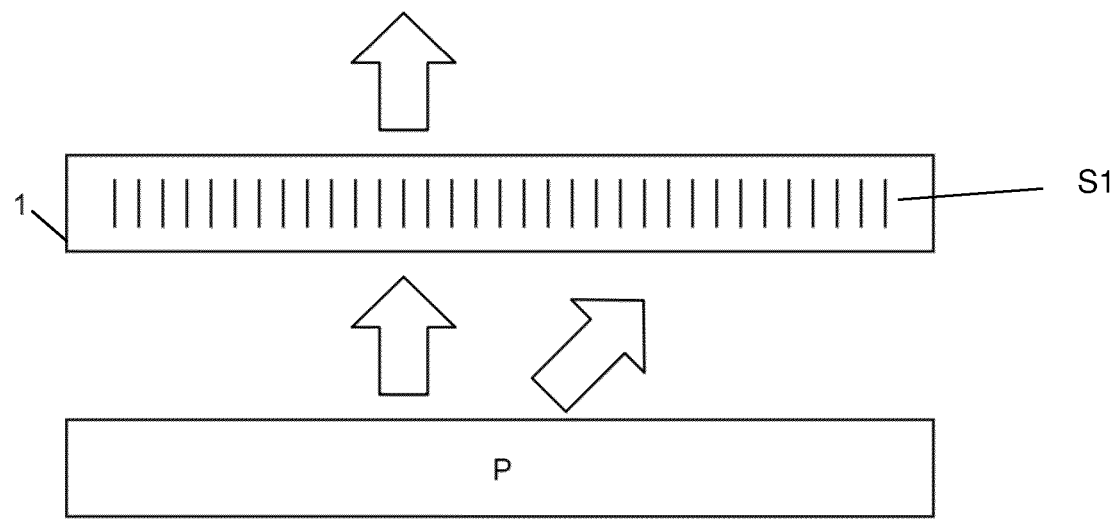
FIG. 1a the schematic diagram of a non-switchable optical element.

FIG. 1a shows the schematic diagram of an exemplary non-switchable optical element 1. This optical element 1 comprises at least one layer S1. This layer S1 comprises material with a plurality of light-absorbing electric transition dipole moments (shown here schematically as small vertical lines) which—at least in a first state—are aligned (in this case perpendicular to the surface of the layer S1) parallel to a selectable preferential direction or fluctuate around this preferential direction, for which reason the aforementioned preferential direction forms an angle of between and 45° to the surface normal of layer S1 so that light which is incident in the optical element is transmitted or partially or entirely absorbed depending on its incident direction relative to the layer S1 and depending on its polarization characteristics.

The optical element 1 can be produced, for example, by laminating a plurality of polymer film polarizers and/or by means of photoalignment of molecules or particles. The density of the aforementioned electric transition dipoles in layer S1 may vary depending on implementation. In a passive polarizer, the volume density can approach 100%.

The material of the optical element 1 which contains the transition dipole moments can also contain at least one kind of dye, particularly a kind of dye molecule, preferably at least one kind of dichroic dye or a dichroic dye mixture. A dye molecule can advantageously correspond to a transition dipole moment. A dye typically has a mass fraction of from 0.01% to 30%, preferably from 0.1% to 15% or 5%, or from 0.01% to 10% of material of the respective layers S1, S2, . . . . The thickness of the layers preferably ranges from 0.2 µm to 50 µm, preferably from 0.5 µm to 20 µm. The dyes or dye mixtures may vary between the different layers.

The layers S1, S2, . . . which contain the transition dipole moments can also contain liquid crystals or polymers and/or be mixed with liquid crystals. Layers S1, S2, . . . preferably contain a mixture of liquid crystals or polymers and at least one dye, preferably at least one dichroic dye mixture.

The optical element 1 constitutes a privacy filter for linearly polarized light. Therefore, a polarization filter P is provided here which polarizes light that is incident from below parallelly linear to the drawing plane. However, the polarization filter P does not alter the light propagation directions. Two possible light propagation directions are indicated by the two large arrows. Owing to the effect of the transition dipole moments, the light is absorbed through the optical element 1 which, for example, has an (oblique) direction of somewhat greater than 30° to the preferential direction, in this case the perpendicular bisectors to layer S1. Finally, after passing through the optical element 1, there remains substantially only the light incident along the preferential direction or, in this case, perpendicular to the optical element 1 as is shown by the solitary arrow at the top in the drawing. Depending on the case of application, each of the layers S1, S2, . . . is constructed to be periodic or non-periodic in structure.

The extinction (i.e., the absorption) of the light depends on the absolute number of the transition dipole moments and therefore inherently also on the layer thicknesses of the material with the transition dipole moments. The density of the aforementioned transition dipole moments, their strength or the refractive index in the layers S1, S2, . . . may vary depending on implementation. In a passive, i.e., non-switchable, optical element 1, the volume density of the transition dipoles can approach 100%.

Figure 11:
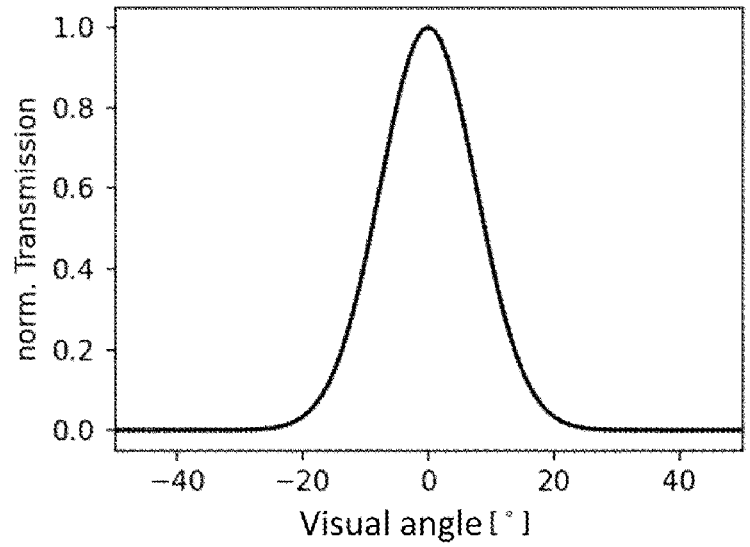
FIGS. 11-15 optical simulations for illustrating the optical effect of an optical element.
Figure 12:
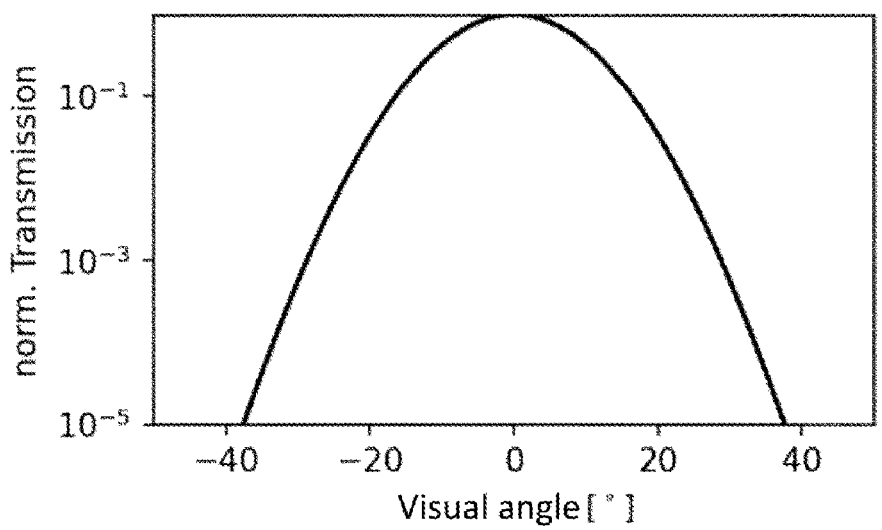
Figure 13:
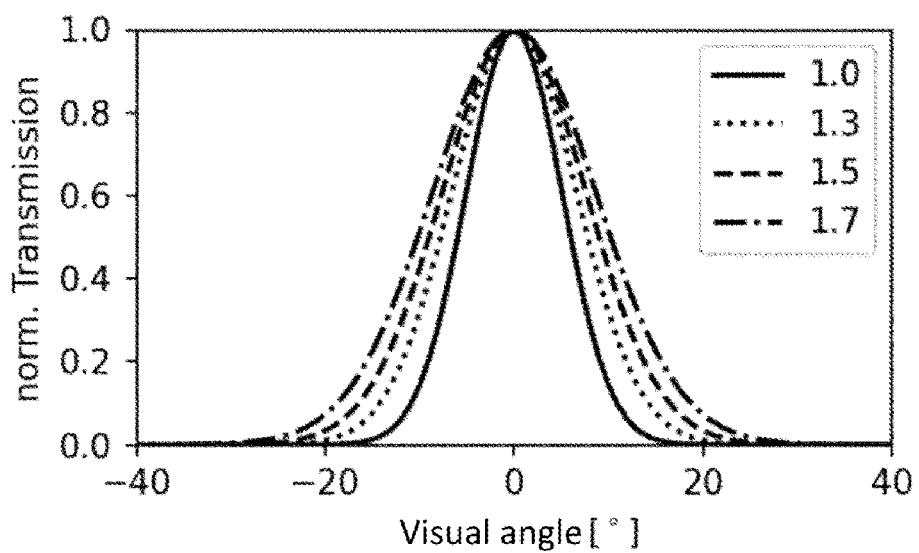
Figure 14:
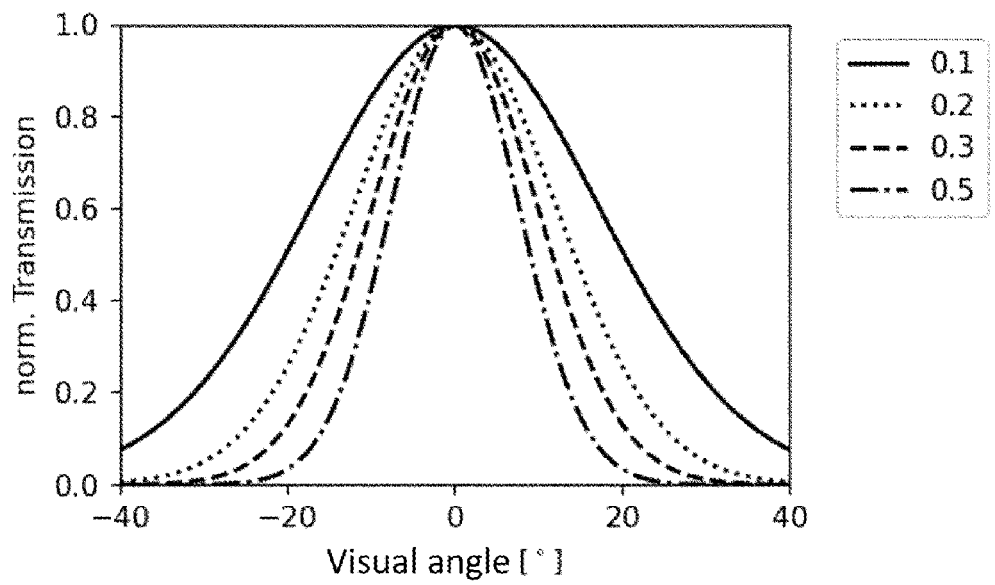
Figure 15:
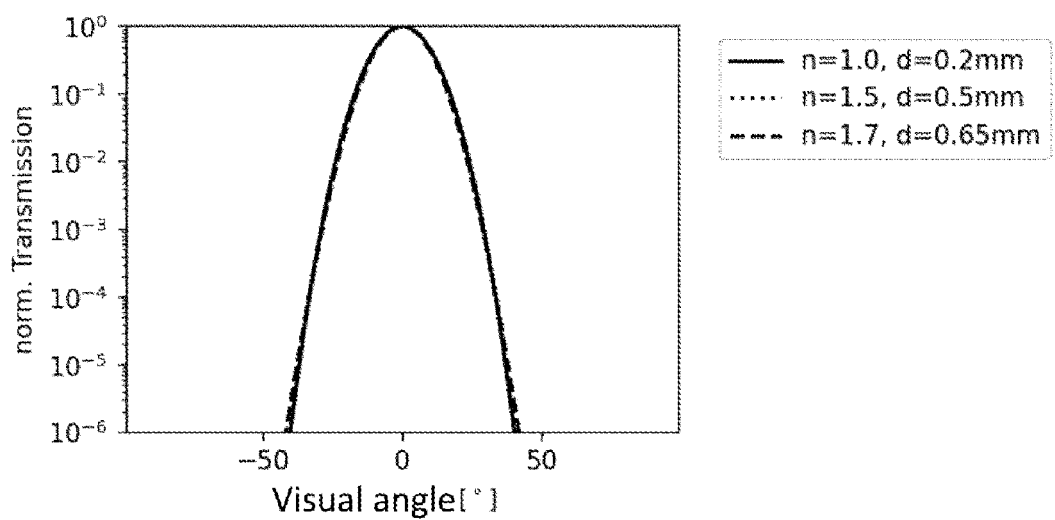

In this regard, the drawings in FIGS. 11 to 15 show optical simulations for illustrating the optical effect of an optical element 1. FIG. 11 is a graph showing the normalized transmission of light when passing through an optical element 1 according to FIG. 1 plotted along the horizontal measurement angle from −90° to +90°. The strong absorption effect at angles over ±25° is clearly visible. The simulations are based on an assumed layer thickness of an optical element 1 of d=0.5 mm, a refractive index of the material of n=1.5, molarity M=0.01 mol m$^{-3}$ and an exemplary molar extinction of ε=12,700 m$^2$ mol$^{-1}$. The thicknesses and concentration can vary in proportion to one another; accordingly, the same transmission is obtained, for example, with a ten-times smaller thickness and a ten-times higher concentration. In FIG. 12, the ratios shown in FIG. 11 are plotted on the ordinate logarithmically for the essential value range for use. It will be seen that with such parameters, the transmission is already reduced to about one percent at ±25° and at ±40° is already reduced to only around 0.001%. In FIG. 13, the assumptions made for FIG. 11 with respect to the refractive index n were calculated for values of n=1.0; 1.3; 1.5 and n=1.7. It will be seen that the smaller the refractive index of the material of layer S1, the more limited the angle of transmission. Further, FIG. 14 shows a variation of the normalized transmission through an optical element 1 according to the ratios shown in FIG. 11 with respect to the thickness of an optical element 1. Layer thicknesses of d=0.1 mm, 0.2 mm, 0.3 mm, 0.4 mm and 0.5 mm were calculated. Consequently, as expected, a larger layer thickness ensures a sharper limiting of the transmission via the angles. Finally, FIG. 15 shows the angle-dependent normalized transmission for three selected parameter sets (1. n=1.0 and d=0.2 mm; 2. n=1.5 and d=0.5 mm; 3. n=1.7 and d=mm). All three parameter sets produce very similar optical effects.

The microlouver filters known from the prior art (also known as view control filters [VCF] or light control filters [LCF]) make use of geometric optics. As a result of the alternating periodic arrangement of transparent layers and absorbent layers, (virtually) all of the light propagating under large angles relative to a defined direction is absorbed. In this case, the position of the absorbers is controlled. In contrast, with the optical element 1, the transmission of light changes with different propagation directions because the absorption cross section of the molecules changes with the propagation direction. Accordingly, in this case, it is not the position but, on the contrary, the orientation of the absorbers in particular that is controlled. In other words, the effect of the optical element 1 is based on a direction-dependent absorption of the light rays as they pass through it, specifically, independent from the position of the light rays. This applies to non-switchable optical elements as described above and to switchable embodiments described in the following.

To enable switching of the optical effect of the optical element 1, i.e., for a switchable optical element 1, the electric light-absorbing transition dipole moments in every layer S1, S2, . . . can be varied with respect to their orientation and/or their amount so that the respective layer S1, S2, . . . can be brought into at least two different states. Possible embodiments of a switchable optical element 1 or of each layer S1, S2, . . . therein are based, for example, on liquid crystals or fluorophores which can be arranged in a so-called vertical alignment cell or in a liquid crystal cell with homogeneous alignment at the surfaces and can be rotated therein between at least two states. In so doing, the light-absorbing electric transition dipole moments are also rotated and can accordingly take on at least two effect states. It is conceivable particularly in such embodiments that more than two states, e.g., three or eight states, with different respective optical effects are achieved. Other embodiments of liquid crystal cells are also possible.

Figure 1B:
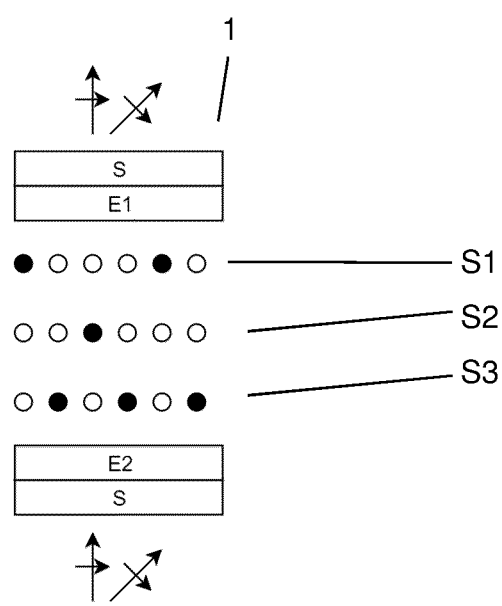
FIG. 1b the schematic diagram of a switchable optical element in a first state.
Figure 1C:
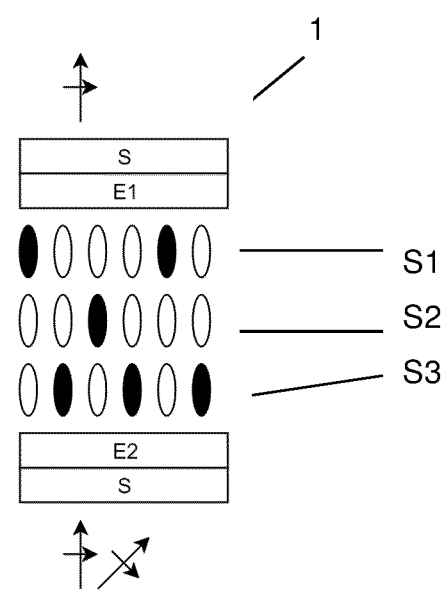
FIG. 1c the schematic diagram of the switchable optical element from FIG. 1b in a second state.

In this connection, FIG. 1b shows the schematic diagram of a switchable optical element in a first state and FIG. 1c shows the schematic diagram of a switchable optical element in the second state.

For this exemplary case, it shall be assumed that the incident light is P-polarized, i.e., polarized parallel to the plane of incidence (see FIG. 1b). If the transparent electrodes E1, E2 are uncharged, i.e., they generate the electric field EF1 with 0 V/m (field-free), the liquid crystal molecules and dye molecules (which are formed in this instance, for example, as layers S1, S2 and S3) shown here as dots are aligned along the surface of electrodes E1, E2. This can be achieved through suitable combination of surface functionalization and liquid crystals and is known in the art. For light which propagates in the drawing plane and is S-polarized, the polarization of the light and transition dipole moments of the liquid crystals are always oriented perpendicular to one another. Therefore, no absorption takes place so that the light propagation directions with S-polarization shown above and below the substrate S pass freely through the switchable optical element 1.

If the electrodes E1 and E2 are charged as shown in FIG. 1c, i.e., they generate the electric field EF2 >0 V/m, the ICH liquid crystals in layers S1, S2 and S3 rotate. If the voltage and therefore the field strength EF2 exceeds a certain threshold, liquid crystal molecules and therefore also dye molecules, if any, are accordingly oriented virtually parallel to the field lines of the electric field EF2. Accordingly, light is absorbed depending on angle α, the angle between the propagation direction of light and the surface normal of the surface of layer S1. The absorption increases with the angle α. The extinction of the electric field of the light is proportional to sine(α). In principle, a control of the orientation of the dye molecules is advantageous in order to control the axis of the protected view or in order to influence the light in a defined manner. In the state shown in FIG. 1b, the transition dipole moments are oriented perpendicular to the polarization of the incident light and, in the state shown in FIG. 1c, parallel to the perpendicular incidence of light. In such switchable optical elements, possible volume densities of the dye range between 0.1% and 20%, or possibly more up to 90% based on liquid crystals.

Figure 2A:
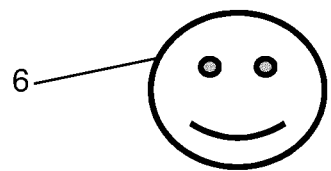
FIG. 2a the schematic diagram of a further optical element.
Figure 2A:
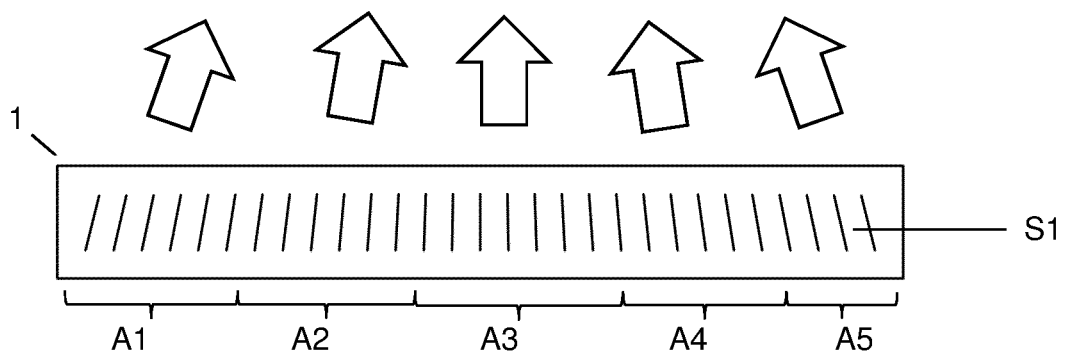

FIG. 2a shows the schematic diagram of a further non-switchable optical element 1. This non-switchable optical element 1 comprises (in this case only illustratively) a layer S1 which comprises material with a plurality of light-absorbing transition dipole moments (indicated in FIG. 2a by the small lines of layer S1). At least in a first state, each transition dipole moment is oriented, with a tolerance of 10° at the maximum, parallel to a respective preferential direction (indicated here by the thick arrows) or fluctuates around it, this preferential direction being selectable for the transition dipole depending on the position of such a transition dipole within the layer S1. At least two such preferential directions in a selectable plane (in this case, the drawing plane) differ by more than 10°. Accordingly, it is brought about that light which is incident in the optical element 1 is transmitted or partially or entirely absorbed depending on its incident direction relative to layer S1 and its polarization characteristics. The highest transmittance for each transition dipole is in the preferential direction selected for its position within layer S1. A tolerance of 10° maximum is allowed.

In contrast to FIG. 1, the optical element 1 shown in FIG. 2 is configured such that layer S1 is divided into different regions A1, A2, A3, A4, A5 along a selectable reference line (in this case, its lower edge), and every region A1, A2, . . . has its own selected regional preferential direction which applies to all of the transition dipole moments of layer S1 located within a region A1, A2, . . . . All of the regional preferential directions differ from one another pairwise and face in direction of an observer 6 to within a tolerance of ±10° at the maximum. Accordingly, all of the transition dipole moments within the layer S1 and within each region A1, A2, . . . applicable to this layer S1 are oriented in each instance parallel to the applicable regional preferential direction with a tolerance of ±10° at the maximum. Because of the definable transmittance on the optical element 1, the latter can be used in a particularly advantageous manner to produce privacy viewing solutions.

To enable switching of the optical effect of the optical element 1, i.e., for a switchable optical element 1, the light-absorbing transition dipole moments in every layer S1, S2, . . . can be varied with respect to their orientation and/or their absolute value and/or their density so that the respective layer S1, S2, . . . can be brought into at least two different states.

Figure 2B:
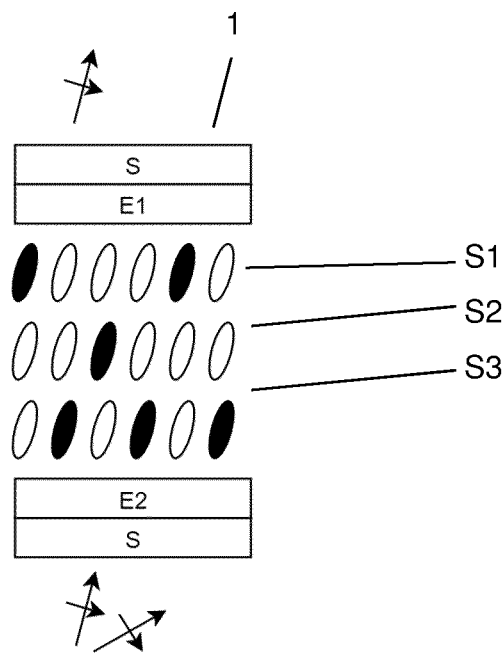
FIG. 2b the schematic diagram of a portion of a further switchable optical element in a first position.
Figure 2C:
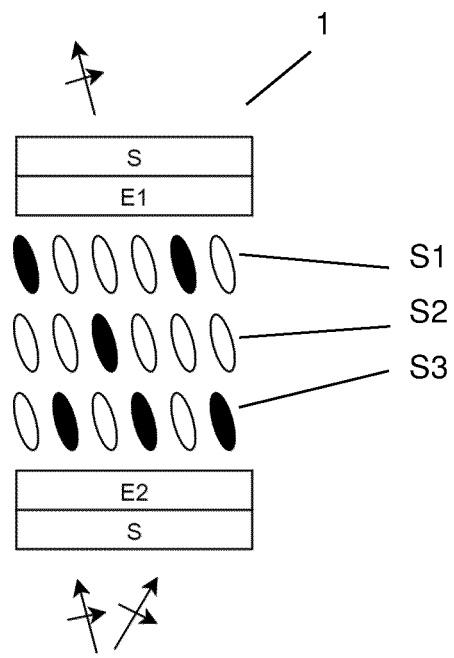
FIG. 2c the schematic diagram of a portion of the further switchable optical element in a second position.

In this regard, FIG. 2b shows the schematic diagram of a first portion of a switchable optical element in a first state corresponding to A1 in FIG. 2a. FIG. 2c shows the schematic diagram of a second portion of a switchable optical element in a first state. This corresponds to A5 in FIG. 2a. Here, three layers S1, S2, S3 are shown by way of example. The liquid crystals which are mixed with the dichroic dye mixture are indicated by the elliptic shapes in layers S1, S2, S3, where in a highly schematic manner the black ellipses represent the dye molecules and the white ellipses represent the liquid crystals. Further, the tilt of the ellipses indicates the spatial orientation. The substrates S can be glass or a polymer or another transparent material.

The respective transparent electrodes E1, E2, e.g., layers of indium tin oxide (ITO layers), are used to control the orientation of the liquid crystals mixed with the dye mixtures. However, the different orientation of the liquid crystal molecules and, therefore, of the dyes is preferably achieved by means of different surface functionalizations. Mechanical and optical methods are contemplated for this purpose. The orientation of the liquid crystals, including dye mixture, shown in FIG. 2b corresponds approximately to the orientation according to the preferential direction of portion A1 in FIG. 2a. The orientation of the liquid crystals, including dye mixture, shown in FIG. 2c corresponds approximately to the orientation according to preferential direction of portion A5 in FIG. 2a. Light which is incident on the optical element 1 from below is transmitted to the maximum extent given the conditions shown in FIG. 2b in direction of the corresponding preferential direction of the transition dipoles; other directions are partially or entirely absorbed. This applies analogously to the conditions shown in FIG. 2c.

As regards the behavior of P-polarized and S-polarized light when entering the optical element in connection with applied electric fields EF1 and EF2, reference is made to the statements referring to FIG. 1b and FIG. 1c which are applicable here in an analogous manner, although the transition dipole moments are oriented differently and although O-polarization instead of S-polarization and E-polarization instead of P-polarization are essential in the medium.

Figure 3:
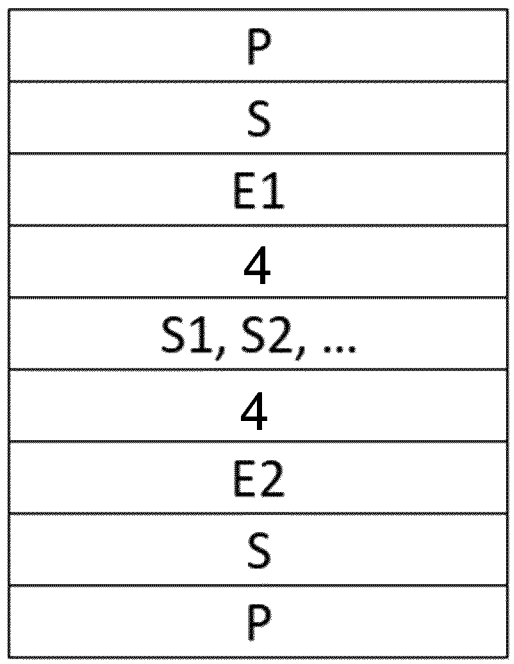
FIG. 3 the schematic diagram of a construction with a switchable optical element according to FIGS. 1b and 1c and FIGS. 2b and 2c.

FIG. 3 shows the schematic diagram of a construction with a switchable optical element 1 according to FIGS. 1b, 1c and FIGS. 2b, 2c. Two linear polarization filters P, one of which is optional, are provided at the outer surfaces, the polarization directions thereof being oriented substantially (that is, within a few degrees tolerance) parallel to one another. Following on the inside—that is, on the sides of the polarization filters P facing one another—is a transparent substrate S followed again inwardly by electrodes E1 and E2. The inwardly facing alignment layers 4 thereof serve for the orientation of liquid crystals which, in a mixture with at least one dichroic dye, form the inner layers S1, S2, . . . . The transition dipole moments are formed in this instance by the at least one dichroic dye. In principle, additional retarder films can also be used in the construction of the optical element 1 in all of the variants described herein in order to further adapt the polarization states.

The electric square wave voltage which is applied between electrodes E1 and E2 preferably has root mean square values between 0 V and 20 V. The orientation layers 4 are, for example, treated surfaces (e.g., brushed glasses or polymers) in order to achieve a uniform surface orientation of the transition dipole moments or liquid crystals. For example, the states shown in FIGS. 2b, 2c can be produced in this way.

Figure 4:
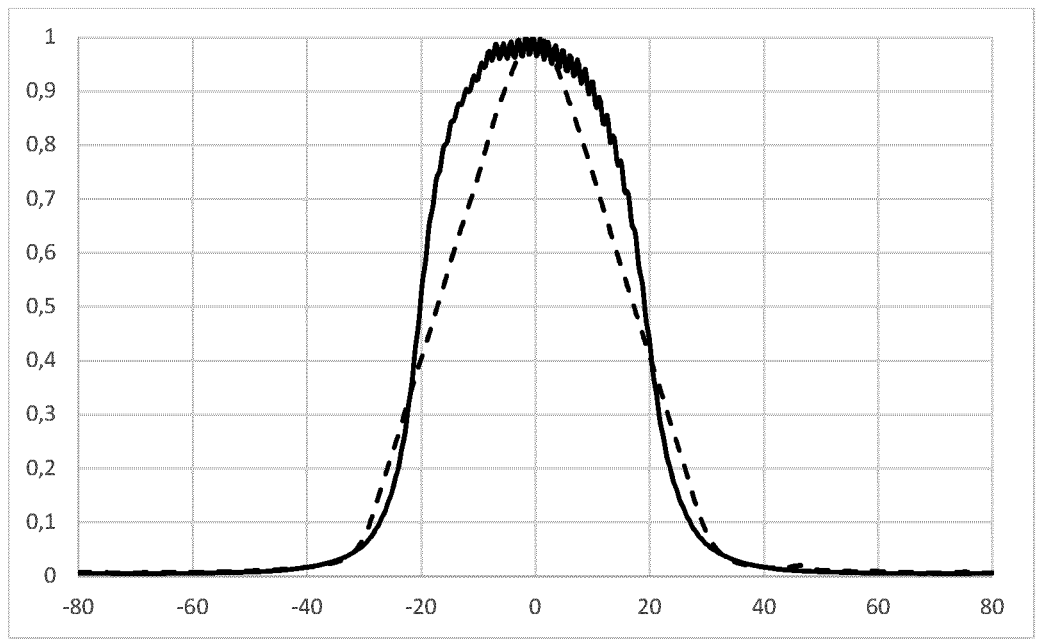
FIG. 4 an exemplary diagram for comparing the transmission behavior of an optical element according to FIGS. 2a-2c measured over different angles with that of a louver filter in the prior art.

Finally, FIG. 4 shows an exemplary graph for comparing the normalized transmission behavior of an optical element 1 (solid line) measured over various angles according to FIG. 2 and FIG. 3 with that of a louver filter from the prior art (dashed line). The respective measurement angle is plotted on the abscissa, and the normalized transmission is plotted on the ordinate. It will be seen that the continuous curve shows an approximate "top hat" distribution for the transmission behavior of an exemplary optical element 1, i.e., the transmission remains stable over a wide angular range of approximately −17° to +17° with at least 80% stability. The half-power width amounts to 40° total in this case. As a result, the observer 6 discerns a good homogeneity of transmission for visual angle changes of ±15% so that, in turn, a good discerned homogeneity is also achieved in the illumination or imaging in combination with an imaging display unit. In contrast, the exemplary louver filter of the prior art used for comparison whose normalized transmission behavior is shown in dashes in FIG. 4 has a reduced half-power width of only approximately 35° and, further, does not have a top-hat-like distribution and also provides an inferior protected view in the angular range of −30° to −25° and +25° to +30° because the transmission is greater than in the optical element 1.

Figure 5:
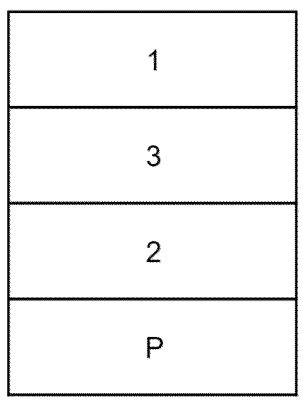
FIG. 5 the schematic diagram of a switchable light filter in a third embodiment with a polarization filter.

The optical element can be used in particular in a switchable light filter 5. FIG. 5 shows a third embodiment of a switchable light filter 5 of this kind. The designation "third" being used prior to "first" and "second" was chosen so as to be consistent with the general description of the invention. This switchable light filter 5 comprises a first optical element 1 and a second optical element 2. The two optical elements 1, 2 per se are not switchable, i.e., they are static. The preferential directions of the transition dipole moments of the two optical elements differ from one another by less than 40°, preferably less than 20° and particularly preferably less than 10°. A first preferential direction is selectable for the first optical element 1, and a second preferential direction is selectable for the second optical element 2. In the present case, the two preferential directions are parallel to one another, for example, and correspond to the perpendicular bisector of the switchable light filter 5 which lies in the drawing plane. A switchable liquid crystal layer 3 which influences or does not influence the polarization characteristics of the light passing through it depending on an electric field EF1 or EF2 acting on it is arranged between the optical elements 1, 2. A polarization filter P is arranged below the optical elements 1, 2 in the drawing and as seen by an observer 6. It could also be arranged above the optical elements 1, 2. Means for selectively generating the first electric field EF1 and the second electric field EF2, for example, electrodes arranged above and below the liquid crystal layer 3, are not shown in the drawing.

In a first operating mode B1 in which the first electric field EF1 is applied and which has a first sub-operating mode B1H and a second sub-operating mode B1V, at least 24% of unpolarized light which is incident in the switchable light filter 5 parallel to the first preferential direction or to the second preferential direction is transmitted on the one hand, and 85% of unpolarized light which is incident in the switchable light filter 5 at an angle of more than 30° relative to the corresponding preferential direction is absorbed on the other hand. This absorption is carried out exclusively in a first direction in the first sub-operating mode B1H and exclusively in a second direction perpendicular to the first direction in the second sub-operating mode B1V. Either the first direction or the second direction is perpendicular to a polarization direction of the polarization filter P. When used in a display screen, the first direction can correspond to the horizontal direction and the second direction can correspond to the vertical direction. By "horizontal" is meant a line extending parallel to the distance line between the eyes of an observer. The horizontal line then extends parallel to the lower edge, for example, and the vertical line extends parallel to the left-hand or right-hand lateral edge of the layer S1 or display screen.

In a second operating mode B2 in which the second electric field EF2 is applied, at least 24% of unpolarized light which is incident in the switchable light filter 5 parallel to the first preferential direction or to the second preferential direction is transmitted on the one hand, and at least 85% of unpolarized light which is incident in the switchable light filter 5 at an angle of greater than 30° to the corresponding preferential direction is absorbed on the other hand.

Figure 6:
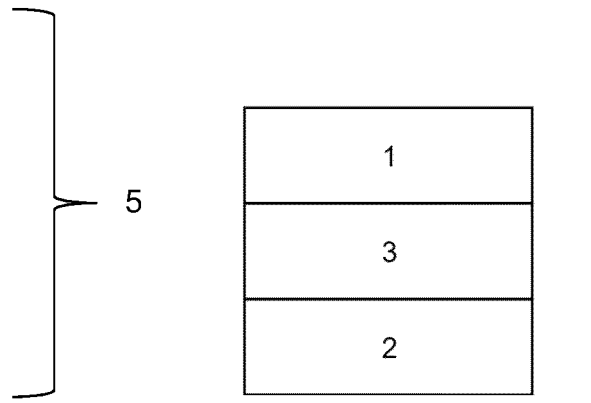
FIG. 6 the schematic diagram of a switchable light filter in a third embodiment without a polarization filter.

FIG. 6 shows a modification of the third embodiment of the switchable light filter 5 without polarization filter P. While the behavior in this modification in operating mode B2 is identical to the switchable light filter 5 described with reference to FIG. 5, at least 24% of unpolarized light which is incident in the switchable light filter 5 at any angle is transmitted in the first operating mode B1 in which the first electric field EF1 is applied.

Accordingly, the switchable light filter 5 of the third embodiment in combination with an imaging display unit allows toggling either between a two-sided protected view and a four-sided protected view (e.g., up/down-protected in B1V versus up/down/left/right-protected in B2) when there is a polarization filter P or toggling between a free view in all directions and a four-sided protected view (e.g., free view in B1 versus up/down/left/right-protected in B2) when there is no polarization filter P.

It is possible, for example, that either electric field EF1 or electric field EF2 describes a field-free state, the other respective electric field EF2 or EF1 having an absolute field strength of greater than zero, e.g., 0.5 MV/m. Depending on the configuration of the optical elements 1 and 2, the field-free state may mean that operating mode B2 is in effect. However, it is also possible that operating mode B1 is in effect in the field-free state when a polarization filter P is provided with one of the two sub-operating modes B1H, B1V.

Figure 7A:
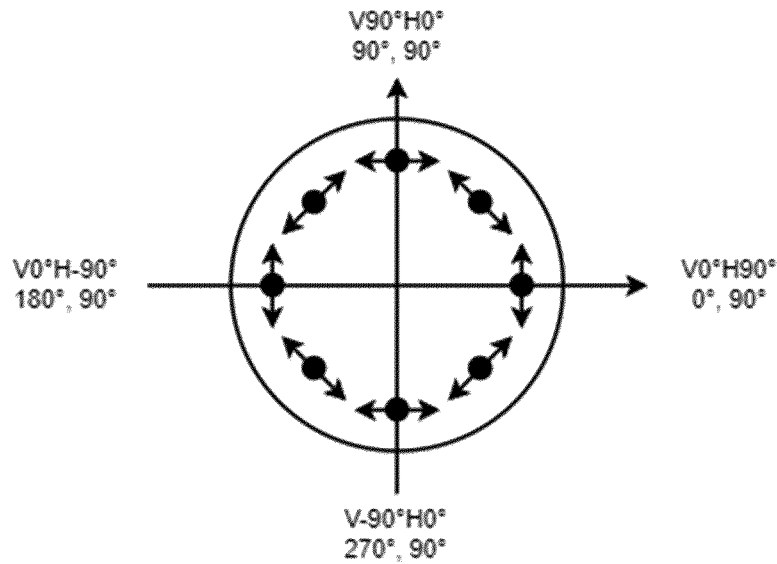
FIG. 7a-7c diagrams illustrating the influencing of light due to a switchable light filter according to FIG. 6.
Figure 7B:
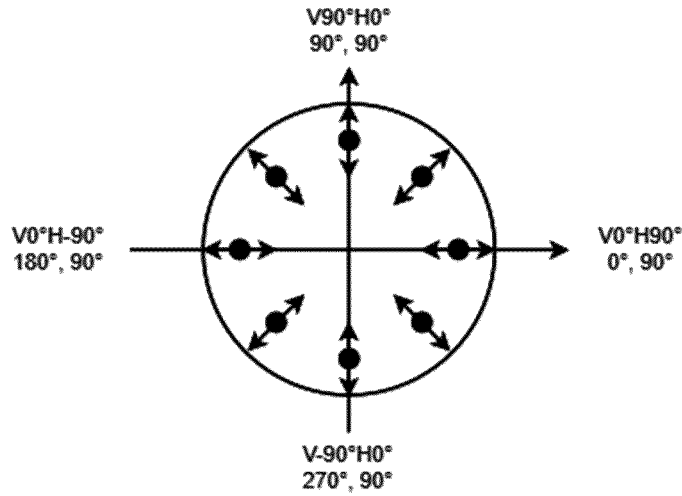
Figure 7C:
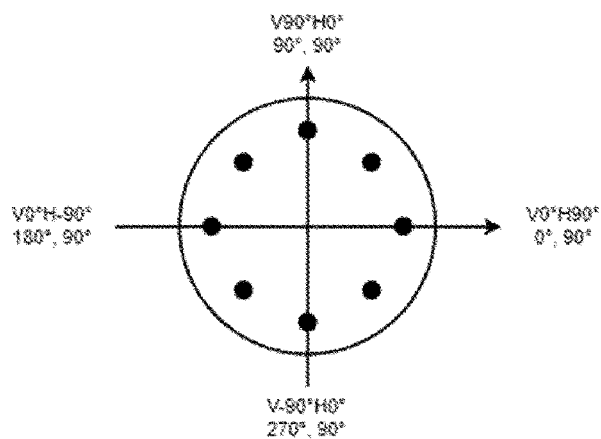

FIGS. 7a to 7c show diagrams of the polarization state of the light due to a switchable light filter according to FIG. 6. FIG. 7a shows the polarization state of the public mode corresponding to operating mode B1 with unrestricted visual angle range in which the light for visual angles greater than 30° is tangentially polarized and light with perpendicular incidence is linearly polarized. The preferential directions correspond to the respective perpendicular bisector. FIG. 7c shows the polarization state in the limited viewing mode. In this case, light for an angle of incidence greater than 30°, for example, is very strongly attenuated, while light with perpendicular incidence of the polarization state is transmitted with no change.

The light for incident angles is polarized through the alignment or orientation of the transition dipole moments, the linear polarization of the light is always oriented perpendicular to the direction of the origin in the visual angle space; in the described case, the origin is the perpendicular bisector. This state is shown in FIG. 7a and is applicable after the light passes through the non-switchable optical element 1. The light with small angles is only slightly polarized. Ideally, the light which is incident perpendicularly is not absorbed, i.e., the polarization state stays the same.

If the light passes out of the optical element 2 into the liquid crystal layer 3, the state of the liquid crystal layer 3 determines whether and, if so, how the polarization state of the light is changed or remains unchanged. For example, if the polarization rotation in the liquid crystal layer 3 is switched off in a field-free state EF1, nothing changes in the above-described state. After passing through the liquid crystal layer 3 and then through the non-switchable optical element 1, the transmission remains substantially unchanged. If there is a polarization filter P above optical element 1 or below optical element 2, one of the sub-operating modes B1H or B1V is achieved depending on the embodiment. If this polarizer is not present, operating mode B1 is realized.

On the other hand, if the polarization rotation in the liquid crystal layer 3 is switched on, for example, by applying an electric field EF2 >0 V/m, the polarization is rotated by 90° overall. FIG. 7b shows the polarization state after passage through the optical element 2 and the polarization-rotating liquid crystal layer 3. Accordingly, in the course of the further propagation of light, all light that propagates under an angle greater than 25° or approximately 30° is extinguished because of the optical element 1. This corresponds to operating mode B2 and is shown in FIG. 4c.

Figure 8:
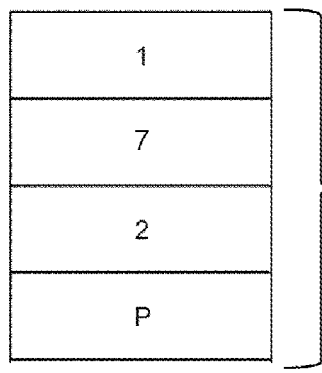
FIG. 8 the schematic diagram of a switchable light filter in a fourth embodiment.

FIG. 8 shows the schematic diagram of a switchable light filter 5 in a fourth embodiment. This switchable light filter 5 comprises two switchable optical elements 1, 2, each of the two optical elements comprising a first layer S1 or a first layer S1 and a plurality of further layers S2, . . . . Similar to the optical elements of the third embodiment, each of the layers S1, S2, . . . comprises a material with a plurality of light-absorbing transition dipole moments. At least in a first state, each transition dipole moment is oriented, with a tolerance of 10° at the maximum, parallel to a first preferential direction selectable for the first optical element 1 and second preferential direction selectable for the second optical element 2 or fluctuates around this so that light which is incident in the first optical element 1 or second optical element 2 is transmitted or at least partially absorbed depending on its incident direction relative to the layers S1, S2, . . . and depending on its polarization state.

However, in contrast to the third embodiment, the optical elements 1, 2 are switchable in this case, i.e., the transition dipole moments in each of the layers S1, S2 . . . can be varied with respect to their orientation and/or their amount between the first state and at least a second state in order to bring the respective layer S1, S2, . . . alternatively into at least two different states. In this embodiment, the switchable light filter 5 comprises means for selectively producing a first electric field EF1 or a second electric field EF2. For each of the two optical elements 1, 2, the first state is produced by applying the first electric field EF1 and the second state is produced by applying the second electric field. In the embodiment example according to the fourth embodiment, the first electric field EF1 is applied to the first optical element 1 and the second electric field EF2 is applied to the second optical element 2.

Optionally, a polarization filter can be arranged above or below the optical element 1 combined as unit. This is not necessary but can improve the performance capability of the switchable light filter 5. The polarization of the polarization filter P and that of the incident light must be congruent. An optically anisotropic layer 7 is arranged between the two optical elements 1, 2 for the 90 degree rotation of a polarization direction of light that passes through the optically anisotropic layer 7. For example, the optically anisotropic layer 7 can be a layer with liquid crystals or a half-wave plate. Means for generating the two electric fields EF1 and EF2 are not shown in the drawing.

When the first electric field EF1 is applied in a first operating mode B1 for a free viewing mode, at least 24% of unpolarized light which is incident in the switchable light filter 5 at any angle thereto is transmitted. In the first operating mode B1, the transition dipole moments of the two optical elements 1, 2 are oriented perpendicular to one another and, in case a polarization filter P is provided, polarization filter transition dipole elements of the polarization filter P are aligned parallel to the transition dipole moments of the switchable optical element 1, 2 located closest to the polarization filter P.

In contrast, when the second electric field is applied in a second operating mode B2 for a limited viewing mode, on the one hand, at least 24% of unpolarized light which is incident in the switchable light guide 5 parallel to the first preferential direction or second preferential direction is transmitted and, on the other hand, at least 85% of unpolarized light which is incident in the switchable light guide 5 at an angle of greater than 30° to the corresponding preferential direction is absorbed. In operating mode B2, the transition dipole moments of the polarization filter P, if present, and the transition dipole moments of the switchable optical element 1, 2 located closest to the polarization filter P are oriented perpendicular to one another, and the transition dipole moments of the two optical elements 1, 2 are oriented parallel to one another. In this case also, the preferential directions preferably correspond to the perpendicular bisector of the switchable light filter 5 which lies in the drawing plane in FIG. 8. With corresponding orientation of the switchable light filter 5 as already mentioned with reference to the third configuration, this applies particularly at the same time in both horizontal and vertical direction when the horizontal is oriented parallel to the lower edge of the layer S1 and the vertical is oriented parallel to the left or right lateral edge of layer S1.

Accordingly, in combination with an imaging display unit, the switchable light filter 5 in this fourth configuration allows toggling between a free view in all directions and a four-sided private view (free view B1 versus up/down/left/right-protected B2).

Figure 9:
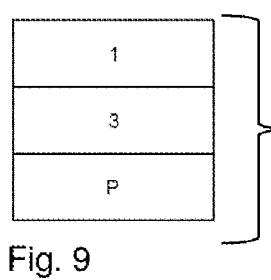
FIG. 9 the schematic diagram of a switchable light filter in a first embodiment.

A first configuration of the switchable light filter 5 is shown as schematic diagram in FIG. 9. It comprises a non-switchable first optical element 1 again comprising a first layer S1 or a first layer S1 and a plurality of further layers S2, . . . , each layer S1, S2, . . . comprising a material with a plurality of light-absorbing transition dipole moments. At least in a first state, each transition dipole moment is oriented, with a tolerance of 10° at the maximum, parallel to a first preferential direction selectable for the first optical element 1 or fluctuates around this so that light which is incident in the first optical element 1 is transmitted or at least partially absorbed depending on its incident direction relative to the layers S1, S2, . . . and depending on its polarization state.

A polarization filter P is arranged upstream or downstream of the first optical element 1. The means for selectively generating a first electric field EF1 or a second electric field EF2 are again not shown in the drawing. A liquid crystal layer 3 which is acted upon by the first electric field EF1 or the second electric field EF2 and which, depending on this, influences the polarization state of light passing through it is arranged between the first optical element 1 and the polarization filter P.

In this first configuration, in a first operating mode B1 in which the first electric field EF1 is applied and which has a first sub-operating mode B1H and a second sub-operating mode B1V, at least 24% of unpolarized light which is incident in the switchable light filter 5 parallel to the first preferential direction is transmitted, and 85% of unpolarized light which is incident in the switchable light filter 5 at an angle of more than 30° relative to the first preferential direction is absorbed on the other hand. This absorption is carried out exclusively in a first direction in the first sub-operating mode B1H and exclusively in a second direction perpendicular to the first direction in the second sub-operating mode B1V. The first preferential direction is again preferably parallel to the perpendicular bisector of the switchable light filter 5 in the drawing plane. With respect to the position of the first direction and second direction, the statements referring to the third embodiment can be applied in an analogous manner.

In a second operating mode B2 in which the second electric field EF2 is applied and with the first sub-operating mode B1H and the second sub-operating mode B1V, at least 24% of unpolarized light which is incident in the switchable light filter 5 parallel to the first preferential direction is transmitted on the one hand, and at least 85% of unpolarized light which is incident in the switchable light filter 5 at an angle of greater than 30° to the first preferential direction is absorbed on the other hand. This absorption is carried out exclusively in the second direction in the first sub-operating mode B1H and exclusively in the second direction perpendicular to the first direction in the second sub-operating mode B1V so that the directions of absorption differ from one another by 90° in each instance for each of the two sub-operating modes B1H, B1V for the first operating mode B1 and the second operating mode B2.

Unlike in the preceding, the two operating modes in this case are operating modes with limited viewing modes, and the protected view can be changed between two directions—for example, horizontal and vertical—which are perpendicular to one another. The configuration of this first embodiment of a switchable light filter 5 can be changed between sub-operating modes B1V and B1H by rotating the polarization filter P 90 degrees.

It is also possible in this case, for example, that either the first electric field EF1 or the second electric field EF2 describes a field-free state and the other respective electric field EF2 or EF1, respectively, has an absolute field strength of greater than zero, e.g., 0.5 MV/m. Depending on the embodiment of the optical element 1 and of the polarization filter P, the field-free state can mean that sub-operating mode B1H is in effect. However, it is also possible that sub-operating mode B1V is in effect in the field-free state.

Accordingly, the switchable light filter 5 of this first embodiment in combination with an imaging display unit allows toggling between a protected view in vertical direction and a protected view in horizontal direction (e.g., up/down-protected in B1V versus left/right-protected in B1H). In a laptop, for example, this would mean that a user can look at the contents in sub-operating mode B1V together with other people located next to the user and at substantially the same eye level, whereas in sub-operating mode B1H the persons positioned to the side cannot see the image contents. The switchable light filter 5 of this third configuration can be varied with respect to its construction as has already been described.

Figure 10:
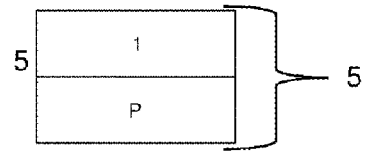
FIG. 10 the schematic diagram of a switchable light filter in a second embodiment.

Finally, FIG. 10 schematically shows a second embodiment of a switchable light filter 5. The first optical element 1 is constructed in a manner similar to the optical element 1 of the first embodiment but, in contrast to the latter, so as to be switchable, i.e., the transition dipole moments in each of the layers S1, S2 can be varied with respect to their orientation and/or their amount between the first state and at least a second state in order to alternatively put the respective layer S1, S2, . . . in at least two different states. A polarization filter P is arranged upstream or downstream of the first optical element 1. Means for selectively generating a first electric field EF1 or a second electric field EF2 are not shown. For the first optical element 1, the first state is produced by applying the first electric field EF1, and the second state is produced by applying the second electric field EF2.

In a first operating mode B1 in which the first electric field EF1 is applied and the transition dipole moments of the layers S1, S2, . . . of the first optical element 1 are oriented along the first preferential direction and which has a first sub-operating mode B1H and a second sub-operating mode B1V, at least 24% of unpolarized light which is incident in the switchable light filter 5 parallel to the first preferential direction is transmitted on the one hand and at least 85% of unpolarized light which is incident in the switchable light filter 5 at an angle of greater than 30° to the first preferential direction is absorbed on the other hand, this absorption taking place exclusively in a first direction in the first sub-operating mode B1H and exclusively in a second direction perpendicular to the first direction in the second sub-operating mode B1V. The first preferential direction is again preferably parallel to the perpendicular bisector of the switchable light filter 5 in the drawing plane. With respect to the position of the first direction and second direction, the statements referring to the third embodiment can be applied in an analogous manner.

In a second operating mode B2 in which the second electric field EF2 is applied, the transition dipole moments of layers S1, S2, . . . of the first optical element 1 are oriented parallel to a surface of the polarization filter P—also referred to in this connection as substrate—and perpendicular to a transmission direction of the polarization filter P. At least 24% of unpolarized light which is incident in the switchable light filter 5 at any angle to the first preferential direction is then transmitted.

Here also, it is again possible, for example, that either electric field EF1 or electric field EF2 describes a field-free state and the other respective electric field EF2 or EF1, respectively, has an absolute field strength of greater than zero, e.g., 0.5 MV/m. Depending on the embodiment of the optical element 1 and of the polarization filter P, the field-free state can mean that operating mode B2 is in effect. However, it is also possible that operating mode B1 with one of the sub-operating modes B1H or B1V is in effect in the field-free state.

Accordingly, the switchable light filter 5 of this second embodiment in combination with an imaging display unit allows toggling between a protected view in vertical direction or in horizontal direction and no protected view effect (up/down-protected in B1V or left/right-protected in B1H versus no protected view B3).

For certain cases of application, a switchable light filter 5 in any of the configurations mentioned above can be divided into a plurality of separately switchable segments so that localized toggling between the respective possible operating states is made possible. In combination with an imaging display unit, this would mean that, for example, only a portion of the image area can be toggled between a protected view and no protected view effect for free viewing, while the complementary portion of the image area is permanently in a privacy mode or not in a privacy mode. There can even be a plurality of such segments geometrically separate from one another which can be toggled between the operating modes separately or jointly.

As has already been stated, the above-described switchable light filter 5 can be combined with an imaging display unit to form a display screen. Such a display screen which can be operated in at least a first operating state B1V and/or B3 for a free viewing mode in horizontal direction and in at least a second operating state B1H and/or B2 for a viewing mode restricted in horizontal direction comprises a switchable light filter 5 as described above in one of the four configurations mentioned above and an imaging display unit arranged downstream or upstream of the switchable light filter 5 from the perspective of an observer 6.

The imaging display unit advantageously corresponds to an LCD panel whose one polarization filter corresponds to the polarization filter P. This can be the front or back polarizer in the LCD construction. Moreover, the switchable light filter can advantageously be arranged between the LCD panel and the backlight thereof in order to toggle between a first operating state B3 (or B1V) for a free viewing mode and a second operating state B1H or B2, respectively, for a limited viewing mode because the light of the backlight is sometimes focused (B2 or B1H) and sometimes not focused (B3 or B1V) in horizontal direction because of the switchable light filter. "Focusing" does not mean, in this instance, focusing in the manner of lenses but rather a narrowing of the emission area or transmission area depending on the incidence angle.

Such a display screen is advantageously used in a mobile device, a motor vehicle, aircraft or watercraft, in a pay terminal or in an access system. Toggling between the aforementioned operating modes can then be carried out in order to protect sensitive data, i.e., to make it visible to only one observer or, alternatively, to display image contents to a plurality of observers simultaneously.

In the optical element described above, light which is incident in and passes through this optical element is transmitted or partially or entirely absorbed depending on its incident direction and its polarization characteristics. A switchable light filter which uses an optical element of this kind influences the transmission of light in an angle-dependent manner (optionally perpendicularly). Toggling can be effected between at least two operating states for a free viewing mode—with respect to the visual angle range for an observer—and a limited viewing mode. In so doing, angle limits particularly in transmission are switchable in particular directions. The optical element or systems based thereon can be implemented at low cost and, in particular, are universally useable with various types of display screen to enable toggling between a protected view existing at least in the horizontal direction and a free viewing mode. In so doing, the resolution of such a display screen is not fundamentally reduced.

The invention described above can advantageously be used in combination with an imaging display device anywhere that confidential data are displayed and/or entered, such as when entering a PIN number or displaying data in automatic teller machines or payment terminals or for entering passwords or when reading emails on mobile devices. As was described above, the invention can also be applied in passenger cars to selectively withhold distracting or unwanted image contents from the driver or passenger.

REFERENCE CHARACTERS 1 first optical element
2 second optical element 3 liquid crystal layer
4 alignment layer
5 switchable light filter
6 observer
7 optically anisotropic layer
A1 . . . A5 regions
E1, E2 electrodes
E2 second electric field
P polarization filter
S transparent substrate
S1 . . . S3 layer

The invention claimed is:

1. A switchable light filter switchable between a first operating mode, and a second operating mode, comprising:
   a first optical element, including:
      a first layer having a material with a plurality of light-absorbing transition dipole moments, and
      wherein, each transition dipole moment is oriented, with a tolerance of 10° at a maximum, parallel to a first preferential direction selectable for the first optical element, such that light which is incident in the first optical element is transmitted or at least partially absorbed, depending on its incident direction relative to the first layer and depending on its polarization state;
   a polarization filter which is arranged upstream or downstream of the first optical element along a light incident direction;
   an electric field generator configured to selectively generate a first electric field in the first operating mode and a second electric field in the second operating mode;
   a liquid crystal layer arranged between the first optical element and the polarization filter, without another polarization filter between the liquid crystal layer and the first optical element, the liquid crystal layer arranged and configured to receive the first electric field in the first operating mode and the second electric field in the second operating mode, and, depending thereon, influencing the polarization state of light passing through it so that the switchable light filter is configured to:
      in the first operating mode in which the first electric field is applied, transmit at least 24% of unpolarized light which is incident in the switchable light filter parallel to the first preferential direction and, absorb at least 85% of unpolarized light which is incident in the switchable light filter at an angle of greater than 30° to the first preferential direction, and wherein the absorption takes place exclusively along a first direction, which differs from the first preferential direction, and
      in the second operating mode in which the second electric field is applied, transmit at least 24% of unpolarized light which is incident in the switchable light filter parallel to the first preferential direction and absorb at least 85% of unpolarized light which is incident in the switchable light filter at an angle of greater than 30° to the first preferential direction, wherein the absorption takes place exclusively along the second direction which differs from the first direction.

2. The switchable light filter according claim 1, wherein at least one polarization compensation layer is arranged upstream and/or downstream of the liquid crystal layer.

3. The switchable light filter according to claim 1, wherein the each of the first preferential direction and the second preferential direction form an angle of between 0° and 45° to a surface normal of the first layer.

4. The switchable light filter according to claim 1, wherein the switchable light filter is divided into a plurality of separately switchable segments so that localized switching is made possible.

5. The switchable light filter according claim 1, the first layer is constructed non-periodically.

6. A display screen comprising a switchable light filter according to claim 1 and an imaging display unit arranged downstream or upstream of the switchable light filter from a perspective of an observer.

7. The switchable light filter of claim 1, wherein the second direction is perpendicular to the first direction.

8. The optical element according to claim 1, wherein the polarization filter consists of only one polarization filter.

9. A switchable light filter switchable between a first operating mode, and a second operating mode, comprising:
   a first optical element and a second optical element, wherein each of the first optical element and the second optical element comprises:
      a first layer having a material with a plurality of light-absorbing transition dipole moments, and
      wherein, each transition dipole moment is oriented, with a tolerance of 10° at a maximum, parallel to a first preferential direction selectable for the first optical element and to a second preferential direction selectable for the second optical element,
      such that the first layer is configured to transmit or at least partially absorb light which is incident in the first optical element or second optical element, depending on its incident direction relative to the layers and depending on its polarization state,
   an electric field generator configured to selectively generate a first electric field in the first operating mode and a second electric field in the second operating mode, an optically anisotropic layer arranged between the first optical element and the second optical element, the optically anisotropic layer configured to rotate a polarization direction of light passing through the optically anisotropic layer by 90°, a polarization filter arranged above or below one of the first or the second optical elements, such that the switchable light filter is further configured in the first operating mode to align transition dipole elements of the polarization filter to be parallel with the transition dipole moments of a one of the first or the second optical elements positioned closest to the polarization filter, and
   such that the switchable light filter is configured to:
   in a first operating mode in which the first electric field is applied, align the transition dipole moments of the two optical elements perpendicular to one another and transmit at least 24% of unpolarized light which is incident in the switchable light filter at any angle relative to the switchable light filter,
   and
   in a second operating mode in which the second electric field is applied, transmit at least 24% of unpolarized light which is incident in the switchable light guide parallel to the first preferential direction or second preferential direction and absorb at least 85% of unpolarized light which is incident in the switchable light guide at an angle of greater than 30° to the corresponding preferential direction and to align the transition dipole moments of the first and second optical elements parallel to one another.

10. An optical element comprising:
a first layer-including a material with a plurality of light-absorbing transition dipole moments, each transition dipole moment being oriented, with a tolerance of 10° at a maximum, parallel to a selectable first preferential direction, so that light which is incident in the optical element is transmitted or at least partially absorbed depending on its incident direction relative to the first layer,
wherein the first layer is constructed aperiodically with respect to its structure.

11. The optical element according to claim 10, wherein the first preferential direction forms an angle between 0° and 45° to a surface normal of the first layer.

12. The optical element according to claim 10, further comprising a second layer including a material with a plurality of light-absorbing transition dipole moments, each transition dipole moment being oriented, with a tolerance of 10° at a maximum, parallel to a selectable second preferential direction, so that light which is incident in the optical element is transmitted or at least partially absorbed depending on its incident direction relative to the second layer, and
wherein the first and second preferential directions in a selectable plane differ by more than 10°.

13. The optical element according to claim 10, wherein the respective first preferential direction of a transition dipole moment is selectable depending on its position in the first layer.

14. The optical element according to claim 10, wherein the first layer is divided along a selectable reference line on the first layer into different regions, wherein every region can have its own selected regional preferential direction which applies to all of the transition dipole moments of the corresponding layer located within a region and wherein all of the regional preferential directions differ pairwise and face in a direction of an observer to within a tolerance of ±10° at the maximum.

15. The optical element according to claim 10, wherein the material contains at least one dye.

16. The optical element according to claim 10, wherein the material contains liquid crystals.

17. The optical element according to claim 10, wherein the optical element includes a plurality of layers and is formed as a laminate of layers of polymer film polarizers.

18. An illumination device for a display screen, which illumination device is configured to be operated in at least two operating modes: a first operating mode for a free viewing mode and a second operating mode for a limited viewing mode, comprising:
a two-dimensionally extensive backlight which contains the optical element according to claim 10, the back light configured to be switched on in the second operating mode,
a plate-shaped light guide which is located in front of the backlight in a viewing direction and which has out-coupling elements on a surface of the light guide and/or within a volume of the light guide, wherein the light guide is at least 40% transparent to light emanating from the backlight,
illuminants arranged laterally on at least one narrow side of the light guide, the illuminants configured to be switched on in the first operating mode and switched off in the second operating mode,
a linear polarization filter arranged in front of the backlight or in front of the light guide in the viewing direction so that light emanating from the backlight and passing through the polarization filter is limited with respect to its propagation directions.

19. The illumination device according to claim 18, wherein the light guide is at least 70% transparent to the light emanating from the backlight.

20. A display screen which can be operated in at least two operating modes, a first operating mode for a free viewing mode and a second operating mode for a limited viewing mode, comprising:
a two-dimensionally extensive backlight which contains an optical element according to claim 10 and which emits light, the back light configured to be switched on in the second operating mode,
a plate-shaped light guide which is located in front of the backlight in a viewing direction and which has out-coupling elements on a surface of the light guide and/or within a volume of the light guide, wherein the light guide is at least 40% transparent to light emanating from the backlight,
illuminants arranged laterally on at least one narrow side of the light guide, the illuminants configured to be switched on in the first operating mode and switched off in the second operating mode,
a linear polarization filter arranged in front of the backlight or in front of the light guide in the viewing direction so that light emanating from the backlight and passing through the polarization filter is limited with respect to its propagation directions,
a transmissive imaging display device which is arranged upstream of the light guide in the viewing direction and in which the linear polarization filter is arranged.

21. The display screen according to claim 20, wherein the light guide is at least 70% transparent to the light emanating from the backlight.

22. The display screen according to claim 20, wherein the linear polarization filter is arranged in the imaging display device or is a part of the imaging display device.

23. The optical element according to claim 15, wherein the at least one dye is a dichroic dye mixture.

* * * * *

UNITED STATES PATENT AND TRADEMARK OFFICE
CERTIFICATE OF CORRECTION

PATENT NO. : 11,906,828 B2
APPLICATION NO. : 17/758617
DATED : February 20, 2024
INVENTOR(S) : André Heber et al.

It is certified that error appears in the above-identified patent and that said Letters Patent is hereby corrected as shown below:

In the Claims

In Column 29, Claim 2, Line 63, after "according" insert -- to --.

In Column 30, Claim 5, Line 7, after "according" insert -- to --.

In Column 30, Claim 5, Line 7, after "claim 1," insert -- wherein --.

In Column 30, Claim 6, Line 10, after "claim 1" insert -- , --.

Signed and Sealed this
Tenth Day of September, 2024

Katherine Kelly Vidal
*Director of the United States Patent and Trademark Office*